US012717865B2

(12) United States Patent
De Vita et al.

(10) Patent No.: US 12,717,865 B2
(45) Date of Patent: Aug. 25, 2026

(54) ITERATION ENGINE FOR THE COMPUTATION OF LARGE KERNELS IN CONVOLUTIONAL ACCELERATORS

(71) Applicants: STMICROELECTRONICS S.r.l., Agrate Brianza (IT); STMicroelectronics International N.V., Geneva (CH)

(72) Inventors: Antonio De Vita, Milan (IT); Thomas Boesch, Rovio (CH); Giuseppe Desoli, San Fermo Della Battaglia (IT)

(73) Assignees: STMICROELECTRONICS S.r.l., Agrate Brianza (IT); STMicroelectronics International N.V., Geneva (CH)

( * ) Notice: Subject to any disclaimer, the term of this patent is extended or adjusted under 35 U.S.C. 154(b) by 1084 days.

(21) Appl. No.: 17/859,769

(22) Filed: Jul. 7, 2022

(65) Prior Publication Data

US 2024/0012871 A1 Jan. 11, 2024

(51) Int. Cl.
*G06F 17/15* (2006.01)
*G06F 7/544* (2006.01)

(52) U.S. Cl.
CPC ............ *G06F 17/15* (2013.01); *G06F 7/5443* (2013.01)

(58) Field of Classification Search
CPC ............................... G06F 17/15; G06F 7/5443
See application file for complete search history.

(56) References Cited

U.S. PATENT DOCUMENTS 9,779,786 B1 10/2017 Wu et al.
10,839,543 B2 11/2020 Cheng et al.
2018/0189215 A1 7/2018 Boesch et al.
2018/0189229 A1 7/2018 Desoli et al.
2018/0189424 A1 7/2018 Boesch et al.
2018/0189641 A1 7/2018 Boesch et al.
2018/0189642 A1 7/2018 Boesch et al.
2018/0218275 A1 8/2018 Arrigoni et al.
2019/0197401 A1 6/2019 Jaganathan et al.
2019/0266485 A1 8/2019 Singh et al.
2019/0340314 A1 11/2019 Boesch et al.
2019/0377840 A1 12/2019 Boesch et al.
2020/0167309 A1* 5/2020 Nicol .................. G06F 15/7867
2020/0272779 A1 8/2020 Boesch et al.
2020/0336155 A1* 10/2020 Ovsiannikov ....... H03M 7/6005
2021/0073450 A1 3/2021 Boesch et al.

FOREIGN PATENT DOCUMENTS

CN 111160535 A 5/2020

* cited by examiner

*Primary Examiner* — Michael D. Yaary
(74) *Attorney, Agent, or Firm* — Seed IP Law Group LLP

(57) ABSTRACT

A convolutional accelerator includes a feature line buffer, a kernel buffer, a multiply-accumulate cluster, and iteration control circuitry. The convolutional accelerator, in operation, convolves a kernel with a streaming feature data tensor. The convolving includes decomposing the kernel into a plurality of sub-kernels and iteratively convolving the sub-kernels with respective sub-tensors of the streamed feature data tensor. The iteration control circuitry, in operation, defines respective windows of the streamed feature data tensors, the windows corresponding to the sub-tensors.

25 Claims, 17 Drawing Sheets

Digit Recognition

7→7 5→5

8→8 3→3

2→2 4→4

Output

| | | | |
|---|---|---|---|
| 0.5 | 0 | 0.25 | 0.25 |
| 0 | 1.25 | 0.5 | 0.5 |
| 0 | 0.5 | 0.75 | 1.5 |
| 0.5 | 0.25 | 1.25 | 1 |

outDim=(inpDim)/strideDim 14
13
8
4
4 kernel decomposition
(4x4x8 → 2x2x8 + 2x2x8 +
2x2x8 + 2x2x8)

K
$K_{S1}$
$K_{S2}$
$K_{S3}$
$K_{S4}$

| ITER_OFFSET_H | 2 |
| --- | --- |
| ITER_OFFSET_V | 2 |
| ITER_NR_H | 2 |
| ITER_NR_V | 2 |

| i | j | First line | Last line | First | Last | CONF |
| --- | --- | --- | --- | --- | --- | --- |
| 0 | 0 | 0 | 10 | 0 | 11 | C1 |
| 0 | 1 | 0 | 10 | 2 | 13 | C2 |
| 1 | 0 | 2 | 12 | 0 | 11 | C3 |
| 1 | 1 | 2 | 12 | 2 | 13 | C4 |

```
for (i=0;i<ITER_NR_V;i++){
    First line= i*ITER_OFFSET_V
    Last line= 13-(ITER_NR_V-i-1) * ITER_OFFSET_V-1
    for (j=0;j<ITER_nr_h;J++) {
        First=j*ITER_OFFSET_H
        Last=14-(ITER_NR_H-j-1) * ITER_OFFSET_H-1
    }
}
```

= cropped features

*FIG. 15*

ITERATION ENGINE FOR THE COMPUTATION OF LARGE KERNELS IN CONVOLUTIONAL ACCELERATORS

BACKGROUND

Technical Field

The present disclosure generally relates to convolutional accelerators, such as convolutional accelerators used in a learning/inference machine (e.g., an artificial neural network (ANN), such as a convolutional neural network (CNN)).

Description of the Related Art

Various computer vision, speech recognition, and signal processing applications may benefit from the use of learning/inference machines, which may quickly perform hundreds, thousands, or even millions of concurrent operations. Learning/inference machines, as discussed in this disclosure, may fall under the technological titles of machine learning, artificial intelligence, neural networks, probabilistic inference engines, accelerators, and the like. Conventional learning/inference machines can deliver hundreds of teraflops (e.g., one million millions ($10^{12}$) floating-point operations per second) of computing power.

Such learning/inference machines may include or otherwise utilize CNNs, such as deep convolutional neural networks (DCNN). A DCNN is a computer-based tool that processes large quantities of data and adaptively "learns" by conflating proximally related features within the data, making broad predictions about the data, and refining the predictions based on reliable conclusions and new conflations. The DCNN is arranged in a plurality of "layers," and different types of predictions are made at each layer. Hardware accelerators including convolutional accelerators are often employed to accelerate the processing of large amounts of data by a DCNN.

BRIEF SUMMARY

In an embodiment, a convolutional accelerator comprises a feature line buffer, a kernel buffer, a multiply-accumulate cluster coupled to the feature line buffer and the kernel buffer, and iteration control circuitry. The iteration control circuitry, in operation, defines a plurality of sub-tensors of a streamed feature data tensor. The convolutional accelerator, in operation, decomposes a kernel into a plurality of sub-kernels and iteratively convolves the sub-kernels with respective sub-tensors of the defined plurality of sub-tensors of the streamed feature data tensor.

In an embodiment, a system comprises a stream engine and a convolutional accelerator coupled to the stream engine. The stream engine, in operation, streams feature and kernel data. The convolutional accelerator includes a feature line buffer, a kernel buffer, a multiply-accumulate cluster coupled to the feature line buffer and the kernel buffer, and iteration control circuitry. The iteration control circuitry, in operation, defines a plurality of sub-tensors of a streamed feature data tensor. The convolutional accelerator, in operation, decomposes a kernel into a plurality of sub-kernels and iteratively convolves the sub-kernels with respective sub-tensors of the defined plurality of sub-tensors of the streamed feature data tensor.

In an embodiment, a method comprises streaming feature data and kernel data to a convolutional accelerator, and convolving a kernel of the kernel data with a streamed feature data tensor of the feature data. The convolving includes decomposing the kernel into a plurality of sub-kernels, defining a plurality of sub-tensors of the streamed feature data tensor, and iteratively convolving the sub-kernels with respective sub-tensors of the plurality of sub-tensors of the streamed feature data tensor.

In an embodiment, a non-transitory computer-readable medium's contents configure a hardware accelerator to perform a method. The method comprises streaming feature data and kernel data to a convolutional accelerator of the hardware accelerator, and convolving a kernel of the kernel data with a streamed feature data tensor of the feature data. The convolving includes decomposing the kernel into a plurality of sub-kernels, defining a plurality of sub-tensors of the streamed feature data tensor, and iteratively convolving the sub-kernels with respective sub-tensors of the plurality of sub-tensors of the streamed feature data tensor.

BRIEF DESCRIPTION OF THE SEVERAL VIEWS OF THE DRAWINGS

One or more embodiments are described hereinafter with reference to the accompanying drawings.

FIGS. 13 to 15 are conceptual diagrams illustrating example kernel decompositions and iteration control parameters.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to interfaces, power supplies, physical component layout, convolutional accelerators, Multiply-ACcumulate (MAC) circuitry, etc., in a hardware accelerator environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figures 1, 2:
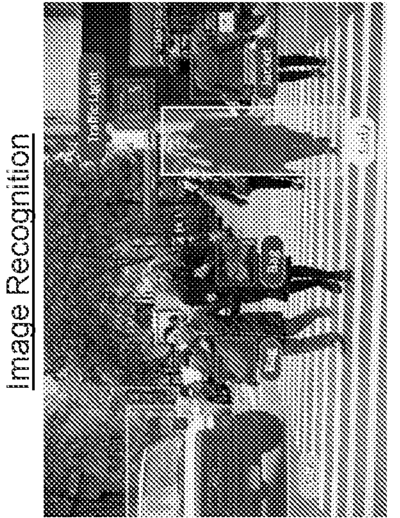
FIG. 1 is a conceptual diagram illustrating a digit recognition task.
FIG. 2 is a conceptual diagram illustrating an image recognition task.

CNNs are particularly suitable for recognition tasks, such as recognition of numbers or objects in images, and may provide highly accurate results. FIG. 1 is a conceptual diagram illustrating a digit recognition task and FIG. 2 is a conceptual diagram illustrating an image recognition task.

Figure 3:
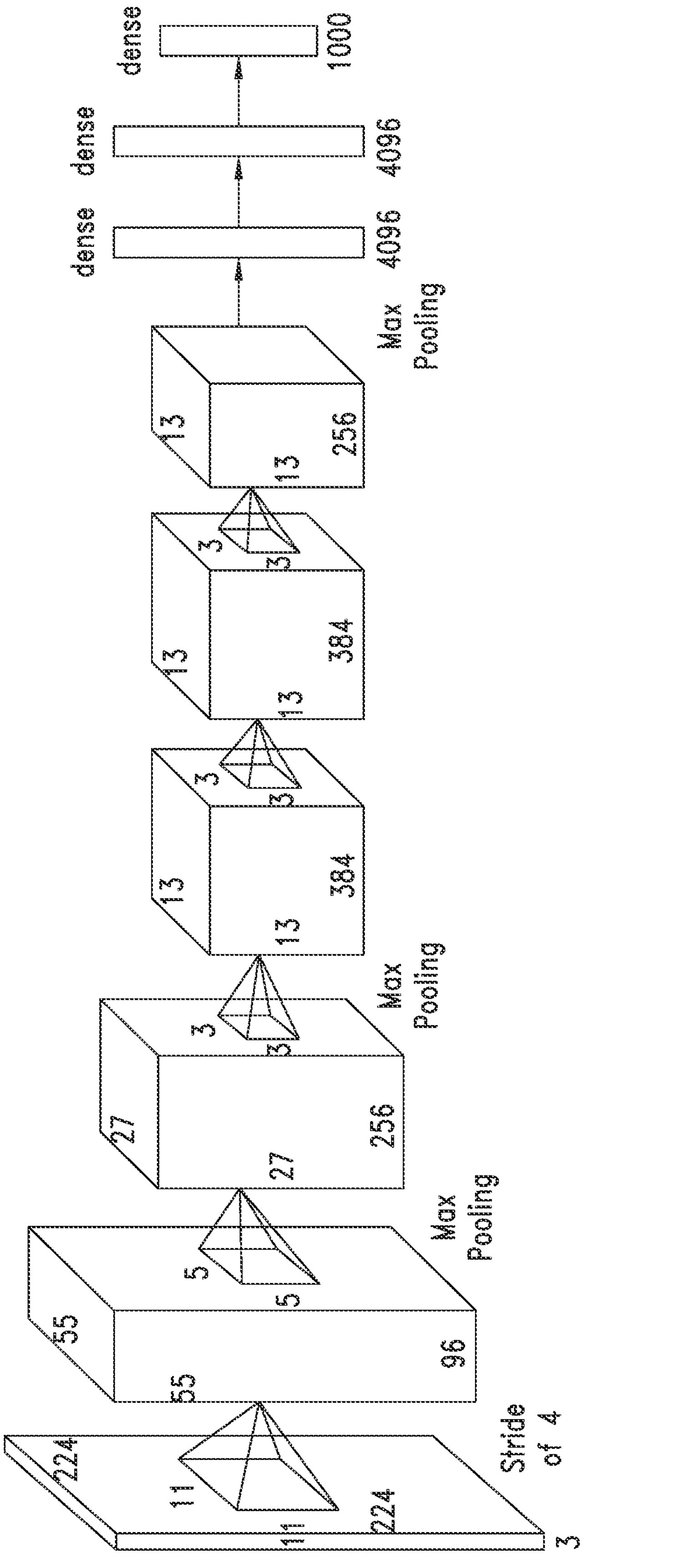
FIG. 3 is a conceptual diagram illustrating an example of a CNN.

CNNs typically have a layered structure. The first layer is an input layer and the last layer is an output layer. The intermediate layers may be referred to as hidden layers. The most used layers are convolutional layers, fully connected or dense layers, and pooling layers (max pooling, average pooling, etc). Data exchanged between layers are called features or activations. Each layer also has a set of learnable parameters typically referred to as weights or kernels. FIG. 3 is a conceptual diagram illustrating an example of an CNN, that is AlexNet. The illustrated CNN has a set of convolutional layers interleaved with max pooling layers, followed by a set of fully connected or dense layers.

Figure 4:
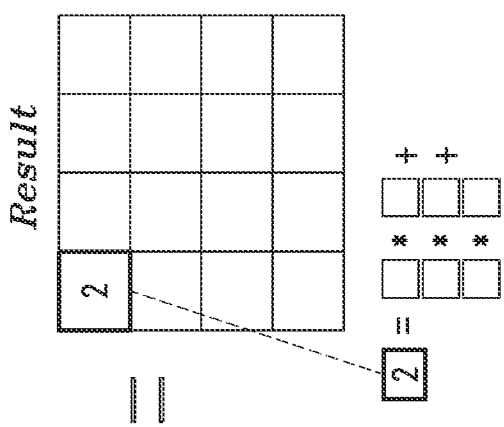
FIG. 4 is a conceptual diagram illustrating an example convolutional layer of a CNN.
Figure 4:
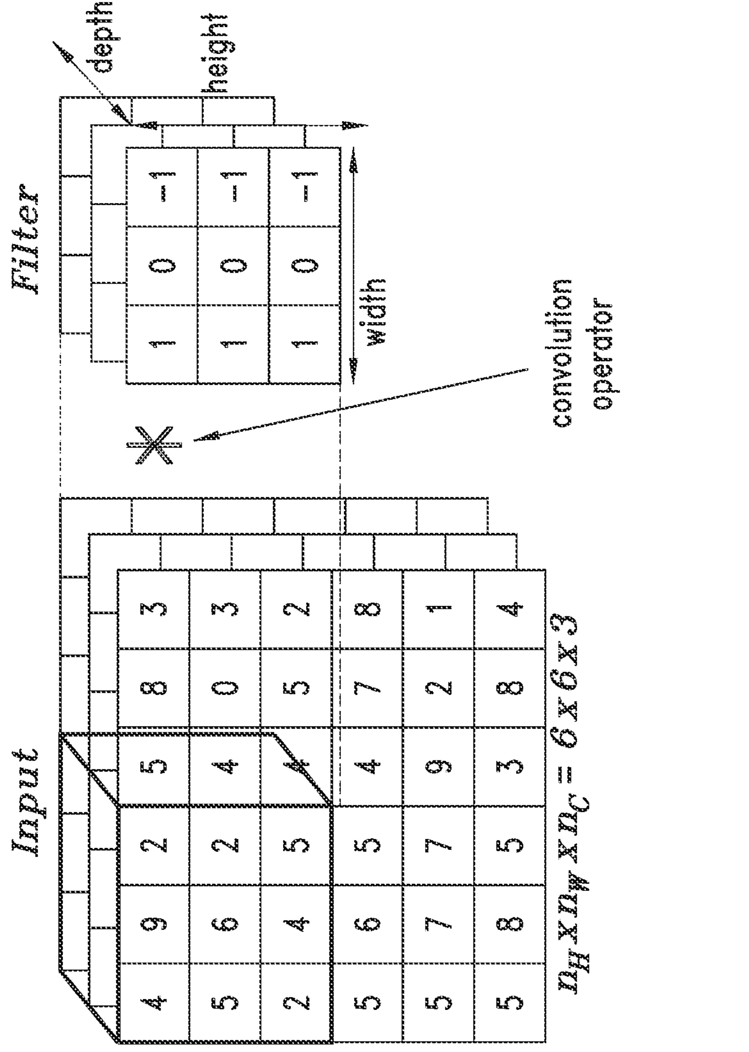

The parameters of a convolutional layer include a set of learnable filters referred to as kernels. Each kernel has three dimensions, height, width and depth. The height and width are typically limited in range (e.g., [1, 11]). The depth typically extends to the full depth of an input feature data. Each kernel slides across the width and the height of the input features and a dot product is computed. At the end of the process a result is obtained as a set of two-dimensional feature maps. In a convolutional layer, many kernels are applied to an input feature map, each of which produces a different feature map as a result. The depth of the output feature tensors is also referred to the number of output channels. FIG. 4 is a conceptual diagram illustrating the application of a kernel to a feature map, producing a two-dimensional feature map having a height of 4 and a width of 4.

Convolutional layers also may have other parameters, which may be defined for the convolutional layer, rather than learned parameters. Such parameters may be referred to as hyper-parameters. For example, a convolutional layer may have hyper-parameters including stride and padding hyper-parameters.

Figure 5:
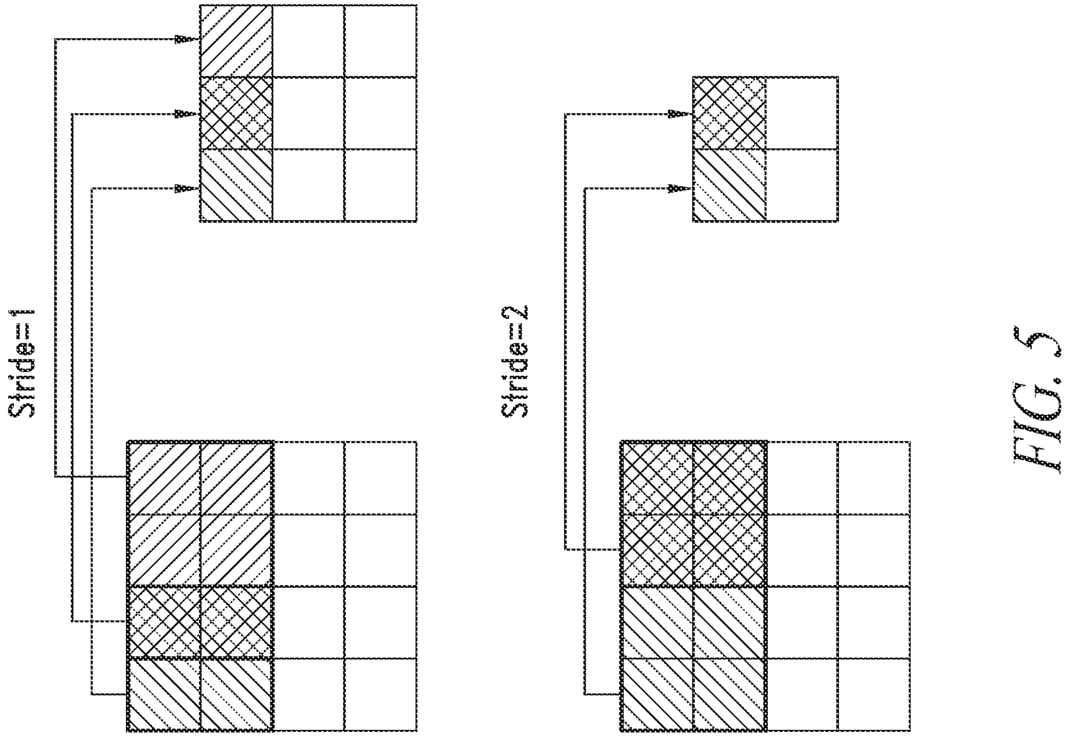
FIG. 5 is a conceptual diagram illustrating strides of convolutional layers of a CNN.

The stride hyper-parameter indicates a step-size used to slide kernels across an input feature map. FIG. 5 is a conceptual diagram comparing a stride of 1 and a stride of 2. When the stride is greater than 1, the output feature map will be smaller than the input feature map.

Figure 6:
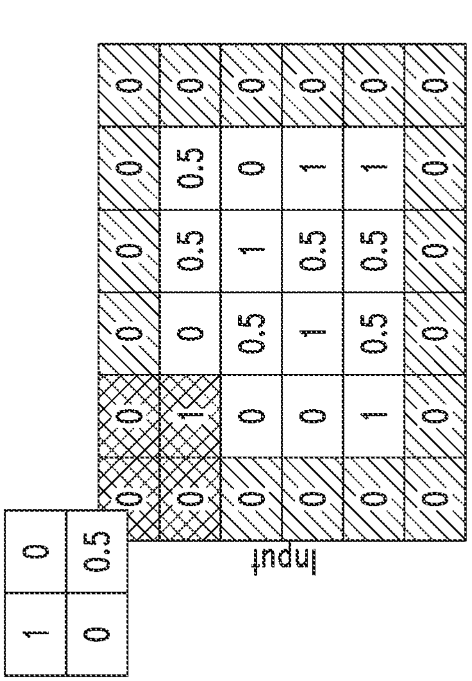
FIG. 6 is a conceptual diagram illustrating application of padding of an input feature map to preserve height and width dimensions during a convolutional.

The padding hyper-parameter indicate a number of zeros to be added along the height, the width or the height and width of the input feature map. The padding parameters may be used to control a size of an output feature map generated by the convolution. FIG. 6 is a conceptual diagram illustrating application of padding to an input feature map. The padding preserves the input feature size along the height and width of the feature map.

Figure 7:
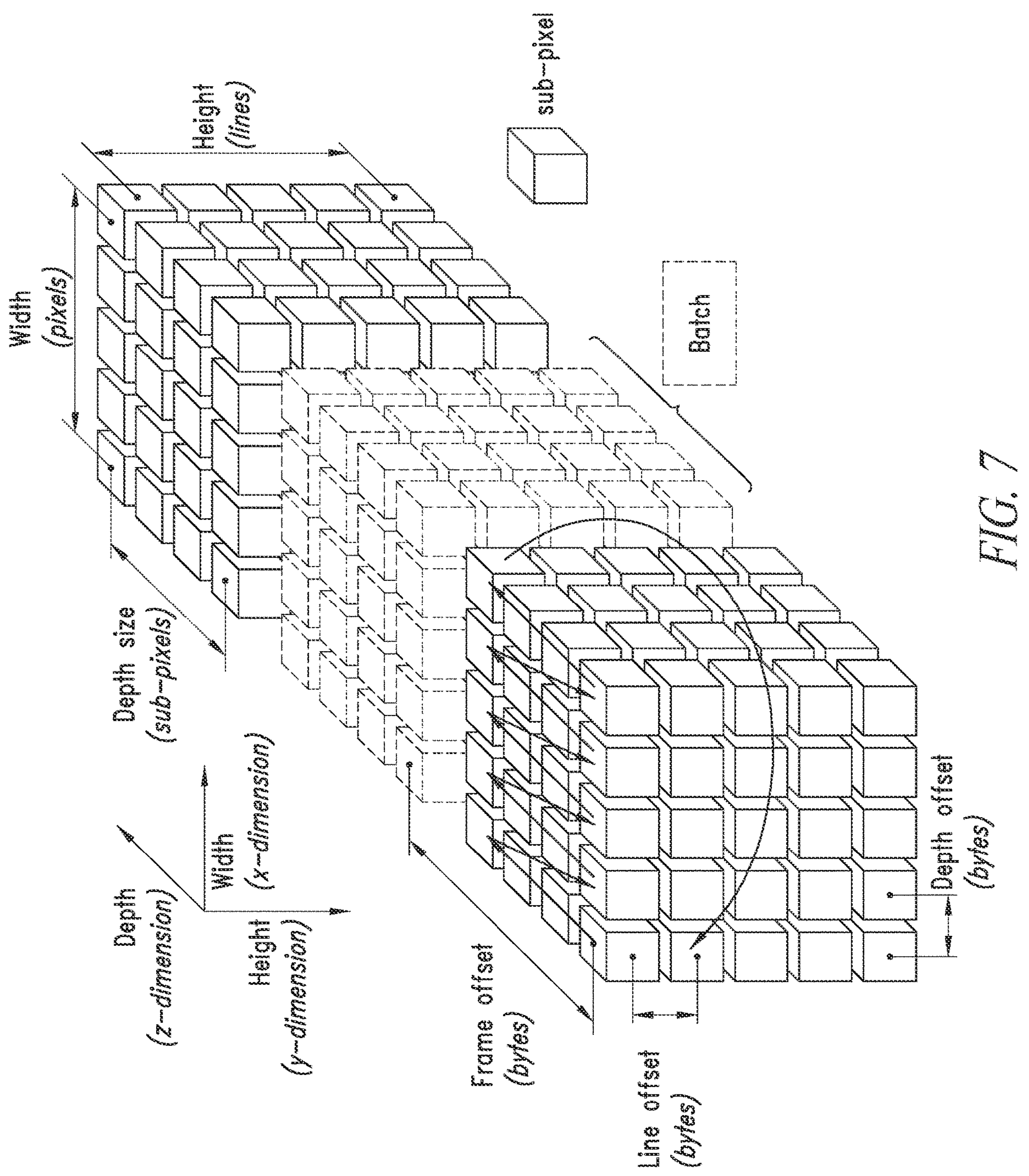
FIG. 7 is a conceptual diagram illustrating loading of feature data in batches.

The feature data of a convolutional layer may have hundreds or even thousands of channels, with the number of channels corresponding to the depth of the feature data and of the kernel data. For this reason, feature and kernel data are often loaded into memory in batches. FIG. 7 is a conceptual diagram illustrating the concept of loading feature data in batches. The feature data is split along the depth dimension into batches, with each batch of feature data having the same height, width and depth. The kernel depth is generally the same as the depth of the input feature map, so similar issues are addressed by batching.

Figure 8:
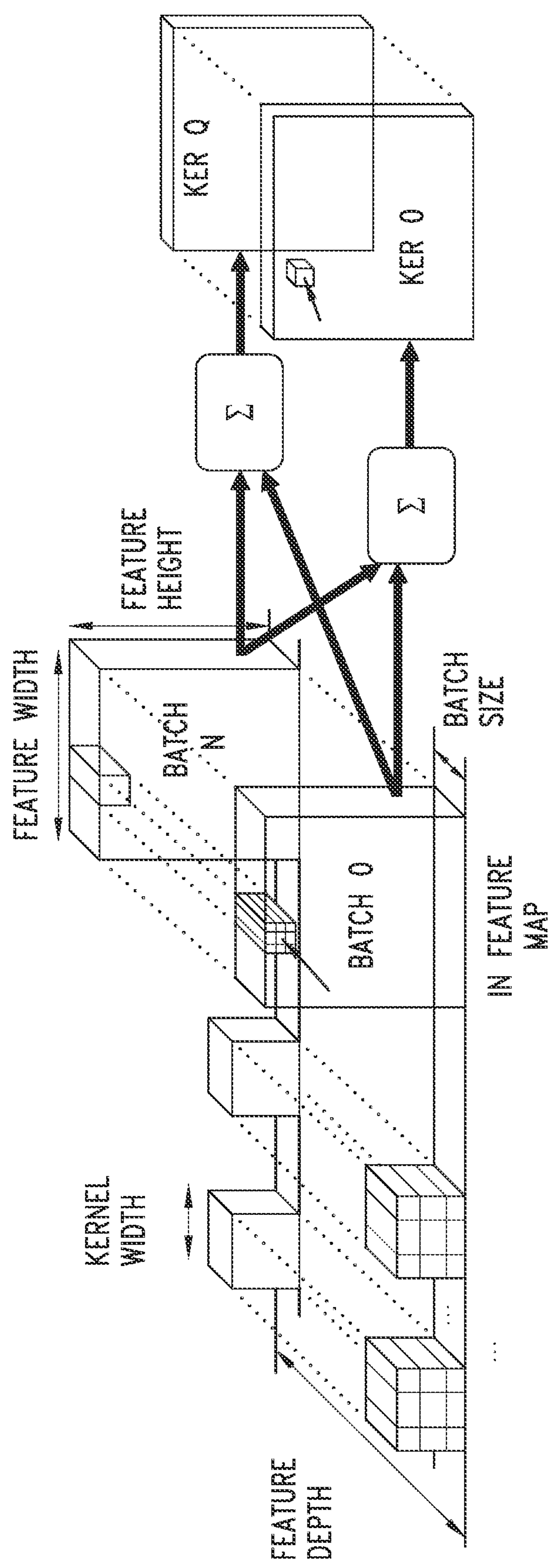
FIG. 8 is a conceptual diagram illustrating processing of a convolution in batches.

As illustrated, the batches have a height of 5, a width of 5, and a depth of 4. Batches are typically written into memory sequentially, with writing of a first batch being completed before beginning the writing of a second batch. The arrows in FIG. 7 illustrate an example order in which data of a batch is written into memory. A similar batching process is typically applied to the kernel data, with each batch of the kernel data having a same kernel height and kernel width, and the same depth as the batches of feature data. Each batch of feature data is convolved with a related batch of kernel data, and a feedback mechanism is employed to accumulate the results of the batches. The conceptual diagram of FIG. 8 illustrates the concept of batch processing of a convolution.

Figure 9:
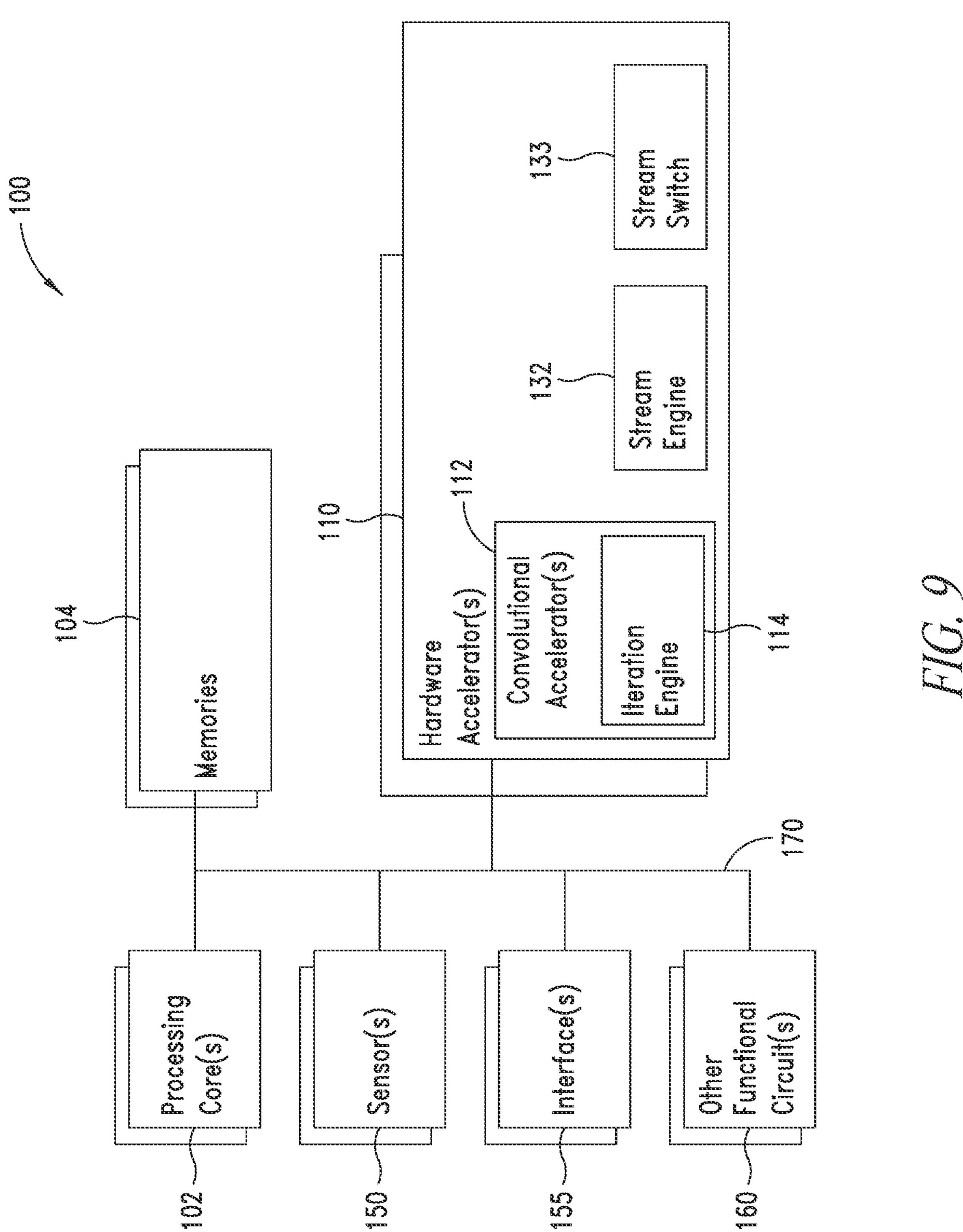
FIG. 9 is a functional block diagram of an embodiment of an electronic device or system.

As can be seen, the computations performed by a CNN, or by other neural networks, often include repetitive computations over large amounts of data. For this reason, computing systems having hardware accelerators may be employed to increase the efficiency of performing operations associated with the CNN. FIG. 9 is a functional block diagram of an embodiment of an electronic device or system 100 of the type to which described embodiments may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., programs which classify images using CNNs), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, which, in operation, may be shared by one or more processes executed by the system 100.

The system 100 may include one or more sensors 150 (e.g., image sensors, audio sensors, accelerometers, pressure sensors, temperature sensors, etc.), one or more interfaces 155 (e.g., wireless communication interfaces, wired communication interfaces, etc.), and other circuits 160, which may include antennas, power supplies, one or more built-in self-test (BIST) circuits, etc., and a main bus system 170. The main bus system 170 may include one or more data, address, power and/or control buses coupled to the various components of the system 100.

The system 100 also includes one or more hardware accelerators 110 which, in operation, accelerate the performance of one or more operations associated with implementing a CNN. The hardware accelerator 110 as illustrated includes one or more convolutional accelerators 112 to facilitate efficient performance of convolutions associated with convolutional layers of a CNN.

The kernel dimensions may vary between CNNs, and between convolutions of a single CNN. For example, in FIG. 3 convolutions with kernels having sizes 11×11, 5×5 and 3×3 are illustrated. Nevertheless, convolutional accelerators are typically designed to support kernel computations below defined kernel height and width sizes, typically 3×3. Adding conventional hardware support to a hardware accelerator for larger kernel height and width sizes than supported by the convolutional accelerator would substantially increase the overhead in terms of larger kernel buffers, additional logic, and increased complexity of the architecture control. The additional complexity is due to the need to extract correct windows of input feature data to be overlapped with a given kernel.

Figure 10:
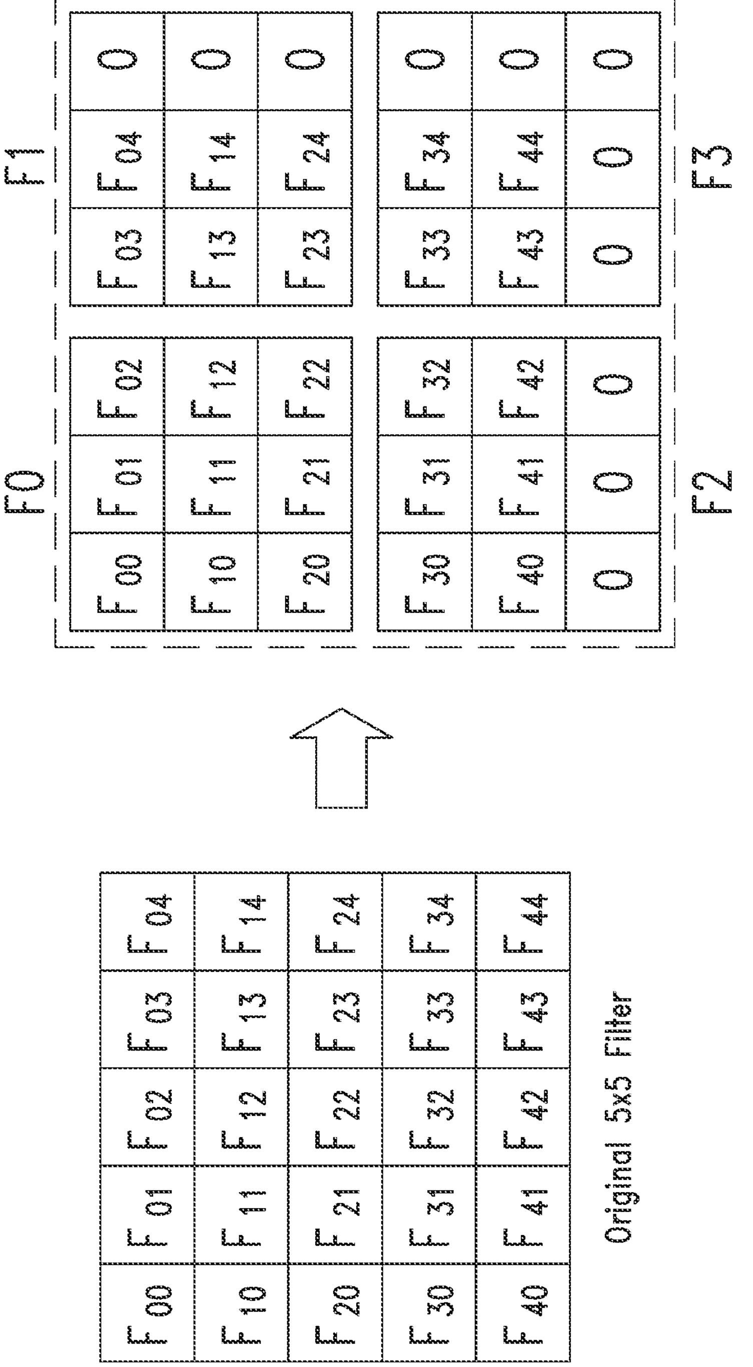
FIGS. 10 and 11 are conceptual diagrams illustrating performing a convolution using kernel decomposition.
Figure 11:
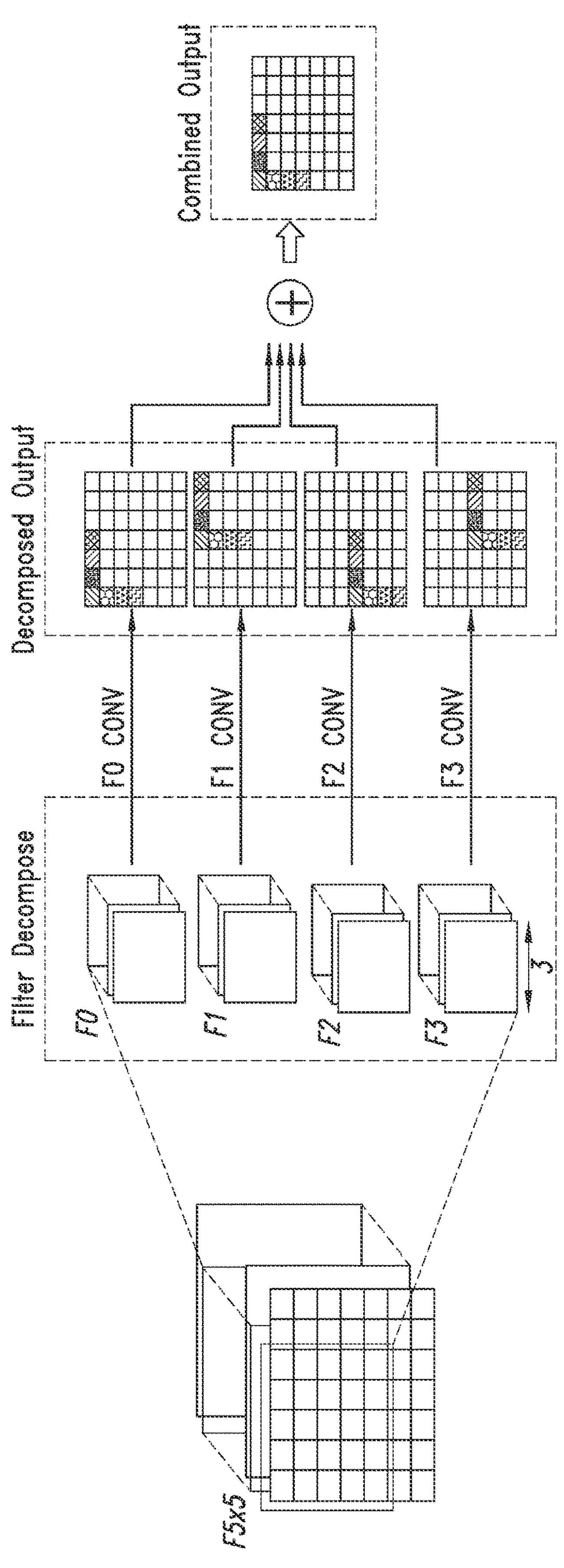

Handling kernel height and width sizes larger than a defined kernel size of a hardware accelerator is instead typically addressed using software-implemented kernel decomposition, for example, implemented using software stored in a memory and executed on a host processor (e.g., memory 104 and processor 102 of FIG. 9). FIGS. 10 and 11 are conceptual diagrams illustrating the concept of kernel decomposition. As shown in FIG. 10, a kernel having a height of 5 and a width of 5 may be decomposed into four sub-kernels each having a height of 3 and a width of 3, with padding employed so that all the decomposed sub-kernels have a same kernel size (e.g., a size supported by a convolutional accelerator). As shown in FIG. 11, separate convolutional operations are performed for each of the decomposed kernels, and the results are then combined to obtain an output corresponding to the larger kernel size. Software implementation reprograms the architecture of the hardware accelerator for each sub-kernel convolution, which means the external memory is accessed frequently using random access operations. Increased accesses to external memory increase the power consumption and decrease the efficiency of the CNN.

As illustrated, the convolutional accelerator 112 of the hardware accelerator 110 of the system 100 includes an iteration engine or circuit 114 to iteratively compute a convolution using a kernel of a size larger than a defined size supported by the convolutional accelerator 112 as a combination of convolutions using smaller kernels. The hardware accelerator 110 as illustrated also includes a stream engine 132 and a stream switch 133. The stream engine 132, in operation, transmits data streams. For example, the stream engine 132 may stream data, such as feature data or kernel data stored in memory 104, to a convolutional accelerator 112 via the stream switch 133.

The iteration engine 114 facilitates executing convolutions on kernels of varying sizes without needing to access external memory and reprogram the architecture for each sub-kernel of a decomposed kernel, or perform kernel decomposition processing using the host processor. Instead, streaming data is retransmitted or reused in an iterative manner as windows of feature data corresponding to the sub-kernels are extracted by the iteration engine, generating sub-tensors of feature data of a streamed feature data tensor. As discussed in more detail below, the iteration engine 114 shifts the windows vertically and horizontally during the iteration process.

The iteration process executed by the iteration engine 114 may be controlled using configuration parameters including:

- an iteration period, ITER_PERIOD, which defines a length of an iteration applied during the iteration process, and may be determined based on a number of batches to be processed during the convolution (e.g., may be set equal to the number of batches);
- a horizontal offset, ITER_OFFSET_H, which defines a horizontal window offset applied during the iteration process, and may be determined based on the offset between adjacent sub-kernels in the horizontal direction;
- a vertical offset, ITER_OFFSET_V, which defines a vertical window offset applied during the iteration process, and may be determined based on the offset between adjacent sub-kernels in the vertical direction;
- a number of horizontal operations, ITER_NR_H, which defines a number of horizontal operations performed during an iteration of the iteration process, and may be set based on the how many sub-kernels the kernel is divided into in the horizontal direction; and
- a number of vertical operations, ITER_NR_V, which defines a number of vertical operations performed during an iteration of the iteration process, and may be set based on the how many sub-kernels the kernel is divided into in the vertical direction. Values of the configuration parameters may be stored in configuration registers (see configuration registers 130 of FIG. 12, configuration registers 148 of FIG. 16).

Embodiments of the system 100 of FIG. 9 may include more components than illustrated, may include fewer components than illustrated, may combine components, may separate components into sub-components, and various combination thereof. For example, the hardware accelerator 110 may include DMA controllers, etc.

Figure 12:
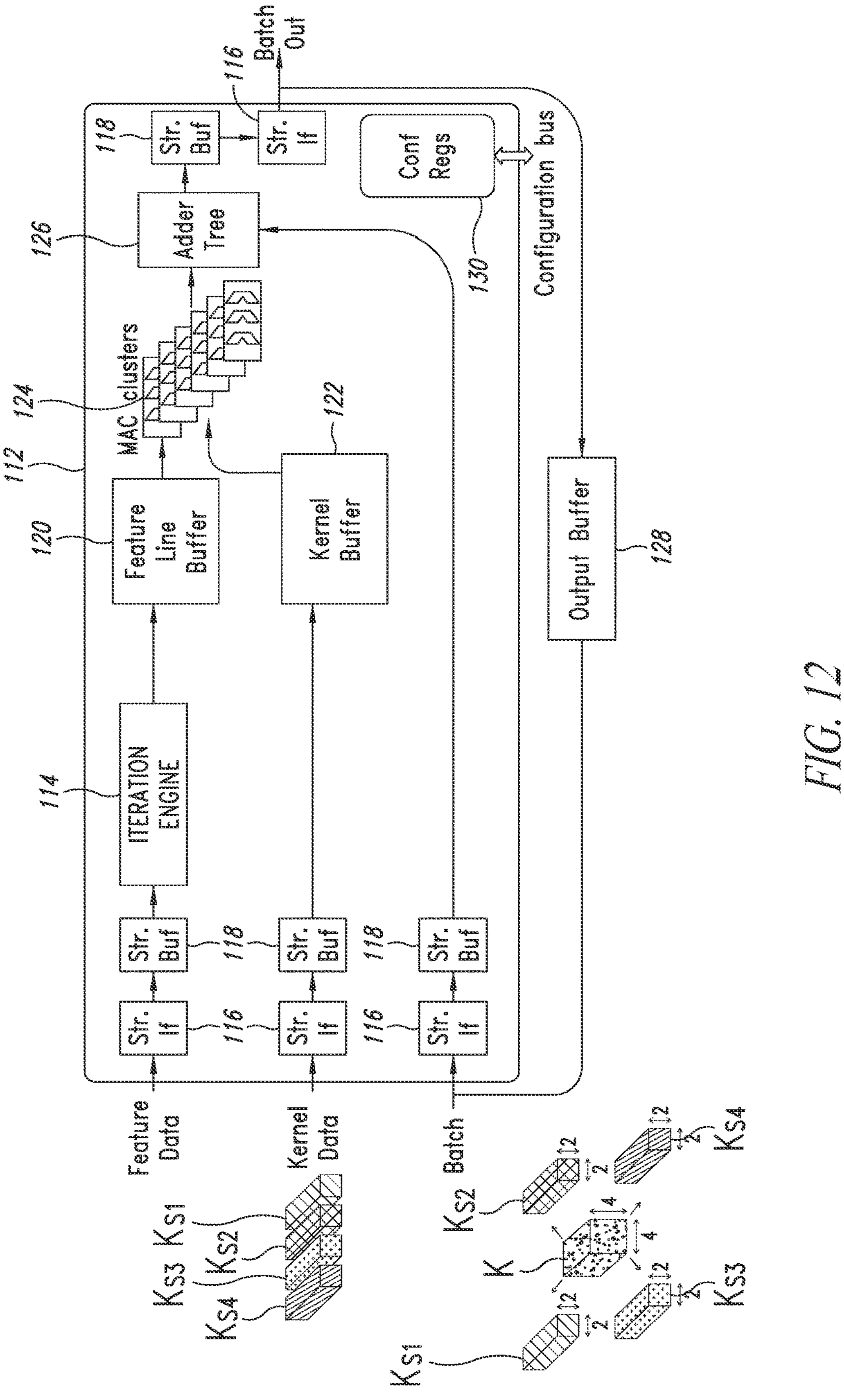
FIG. 12 is a functional block diagram of an embodiment of a convolutional accelerator including an iteration engine.

FIG. 12 is a functional block diagram of a convolutional accelerator 112 including an iteration engine 114. The convolutional accelerator, in operation, iteratively processes a convolution using kernel decomposition according to an embodiment. The iteration engine, in operation, generates sub-tensors of a streamed feature data tensor. Sub-kernels of the decomposed kernel are convolved with respective sub-tensors of the streamed feature data tensor, as discussed in more detail below. The convolutional accelerator 112 as illustrated also includes stream interfaces 116 (which may couple to a stream engine, such as the stream engine 132 via stream switch 133 of FIG. 9), stream buffers 118, a feature line buffer 120, a kernel buffer 122, a cluster of Multiply-ACumulate circuits 124, an adder tree 126, an output buffer 128, and configuration registers 130. The iteration engine 114 is coupled between the stream buffer 118 of the feature data stream and the feature line buffer 120. The kernel values may be stored in the memory in an order which facilitates decomposition of a kernel (conceptually illustrated in FIG. 12 as kernel K having a height of 4 and a width of 4) into sub-kernels (conceptually illustrated as sub-kernels $K_{S1}$, $K_{S2}$, $K_{S3}$, $K_{S4}$, having a height of 2 and a width of 2 in FIG. 12), and the feedback mechanism managed to accumulate the results of the iterations.

Embodiments of the convolutional accelerator 112 of FIG. 12 may include more components than illustrated, may include fewer components than illustrated, may combine components, may separate components into sub-components, and various combination thereof. For example, the configuration registers 130 may be combined with the iteration engine 114 in some embodiments, etc.

Figure 13:
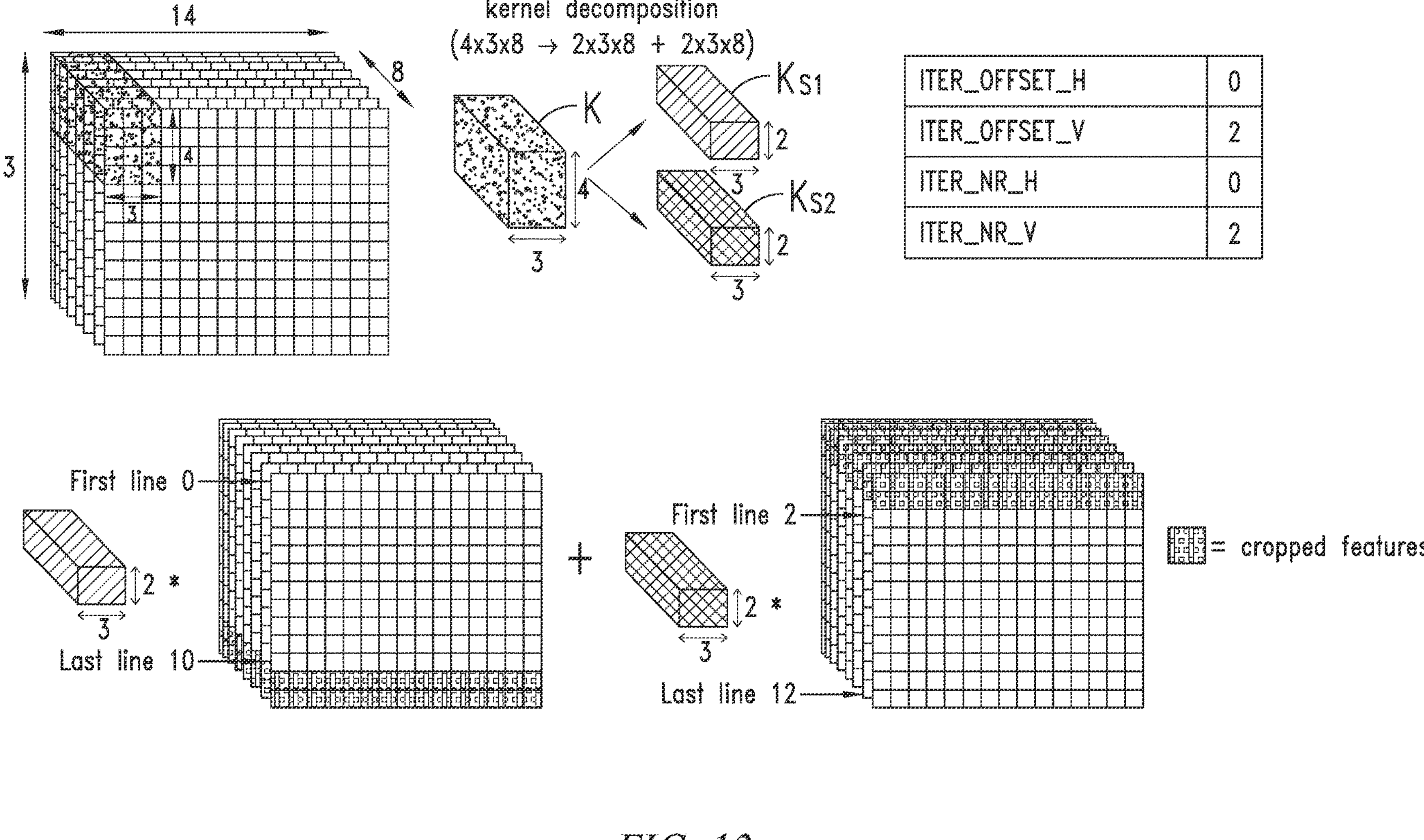

FIG. 13 is a conceptual diagram illustrating applying kernel decomposition to a kernel K having a height of 4, and a width of 3 for processing using a convolutional accelerator having a natively supported kernel height and width of 3×3 (e.g., convolutional accelerator 112). The convolutional accelerator does not natively support kernel sizes of larger than 3×3, such as the kernel K having a size of 4×3. The kernel K may be split into sub-kernels which comply with the dimensional constraints of the convolutional accelerator. As illustrated, the kernel K is split into two sub-kernels having a height of 2 and a width of 3, which comply with the dimensional constraints of the convolutional accelerator.

Because the split is only along the vertical direction, the parameters ITER_OFFSET_H and ITER_NR_H are set to zero. The ITER_OFFSET_V parameter is set to 2 because the offset between sub-kernels in the vertical direction is 2, and the ITER_NR_V is set to two because 2 sub-kernels in the vertical direction are employed in the decomposition of the kernel K.

During the iterative processing of a kernel K, the same feature data is retransmitted or reused multiple times during the processing of the sub-kernels. For example, the feature data may be retransmitted multiple times by a stream engine, for example, by stream engine 132 of FIG. 9. As the kernel K is conceptually slid along the feature data map, the sub-kernel $K_{S1}$ does not overlap the last two rows, and thus does not need to be applied to the data in the last two rows of the feature data map. The feature data in these two rows is not needed during processing of the sub-kernel $K_{S1}$, and may be ignored or cropped. This data does not need to be stored in the feature line buffer for processing by the MAC clusters with the sub-kernel $K_{S1}$. Cropping the unneeded data saves processing resources, such as power and time resources. To facilitate the cropping, additional control parameters identifying a first line and a last line of the feature map to which the sub-kernel $K_{S1}$ is to be applied may be determined.

Similarly, as the kernel K is slid along the feature data map, the sub-kernel $K_{S2}$ is not convolved with the data in the first two rows of the feature data map, thus the feature data in these two rows is not needed during processing of the sub-kernel $K_{S2}$, and may be ignored or cropped. To facilitate the cropping, additional control parameters identifying a first line and a last line of the feature map to convolve with the sub-kernel $K_{S2}$ may be determined.

Figure 14:
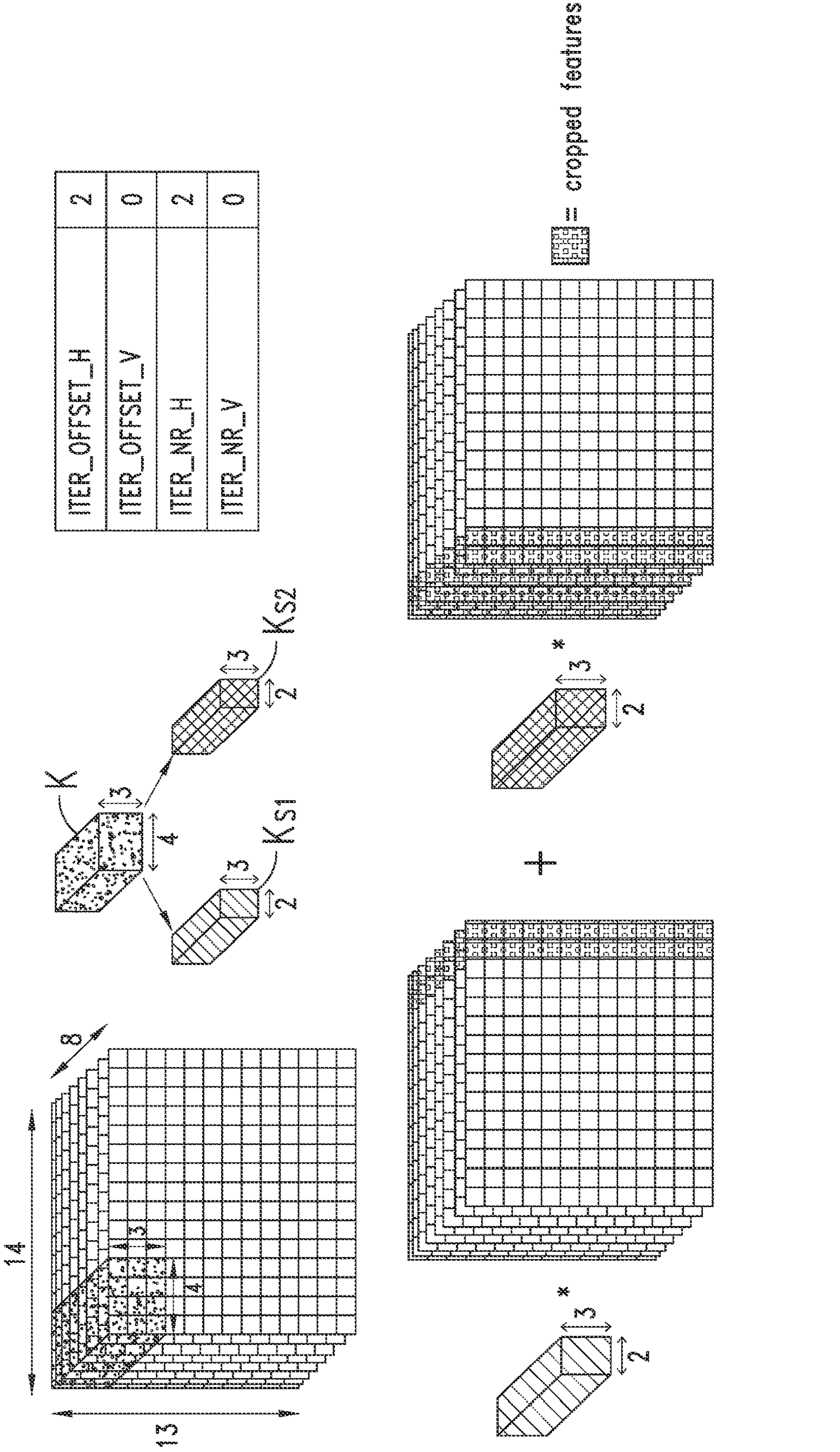

FIG. 14 is a conceptual diagram illustrating applying kernel decomposition to a kernel having a height of 3, and a width of 4 for processing using a convolutional accelerator having a supported kernel height and width of 3×3 (e.g., natively supporting kernels having dimensions of 3×3 or smaller). The kernel K is split into two sub-kernels having a height of 3 and a width of 2. Because the split is only along the horizontal direction, the parameters ITER_OFFSET_V and ITER_NR_V are set to zero. The ITER_OFFSET_H parameter is set to 2 because the offset between sub-kernels in the horizontal direction is 2, and the ITER_NR_H is set to 2 because two sub-kernels in the horizontal direction are employed in the decomposition of the kernel K.

As noted above, during the iterative processing of a kernel K, the same feature data is retransmitted or reused multiple times during the processing of the sub-kernels. As the kernel K is slid along the feature data map, the sub-kernel $K_{S1}$ is not applied to the data in the last two columns of the feature data map, thus the feature data in these two columns is not needed during processing of the sub-kernel $K_{S1}$, and may be ignored or cropped. To facilitate the cropping, additional control parameters identifying a first column and a last column of the feature map to convolve with the sub-kernel $K_{S1}$ may be determined. Similarly, as the kernel K is slid along the feature data map, the sub-kernel $K_{S2}$ is not applied to the data in the first two columns of the feature data map, thus the feature data in these two columns is not needed during processing of the sub-kernel $K_{S2}$, and may be ignored or cropped. To facilitate the cropping, additional control parameters identifying a first column and a last column of the feature map to convolve with the sub-kernel $K_{S2}$ may be determined.

FIG. 15 is a conceptual diagram illustrating applying kernel decomposition to a kernel having a height of 4, and a width of 4 for processing using a convolutional accelerator having a supported kernel height and width of 3×3 (e.g., natively supporting kernels having dimensions of 3×3 or smaller). The kernel K is split into four sub-kernels having a height of 2 and a width of 2 (smaller than the defined 3×3 kernel height and width). The ITER_OFFSET_H parameter is set to 2 because the offset between sub-kernels in the horizontal direction is 2, and the ITER_NR_H is set to 2 because two sub-kernels in the horizontal direction are employed in the decomposition of the kernel K. Similarly, the ITER_OFFSET_V parameter is set to 2 because the offset between sub-kernels in the vertical direction is 2, and the ITER_NR_V is set to 2 because two sub-kernels in the vertical direction are employed in the decomposition of the kernel K. In this case, sub-kernel $K_{S1}$ does not need the feature data in the last two rows and the last two columns, and this data may be cropped during the processing of $K_{S1}$; sub-kernel $K_{S2}$ does not need the feature data in the first two rows and the last two columns, and this data may be cropped during the processing of $K_{S2}$; sub-kernel $K_{S3}$ does not need the feature data in the first two rows and the last two columns, and this data may be cropped during the processing of $K_{S3}$; sub-kernel $K_{S4}$, does not need the feature data in the first two rows and the first two columns, and this data may be cropped during the processing of $K_{S4}$.

Other decomposition configurations may be employed. For example, a 9×9 kernel may be decomposed into a set of nine 3×3 sub-kernels. For a sub-kernel in the center of the kernel, the first three lines of feature data, the last three lines of feature data, the first three columns of feature data, and the last three columns of feature data may be cropped or ignored.

Figure 16:
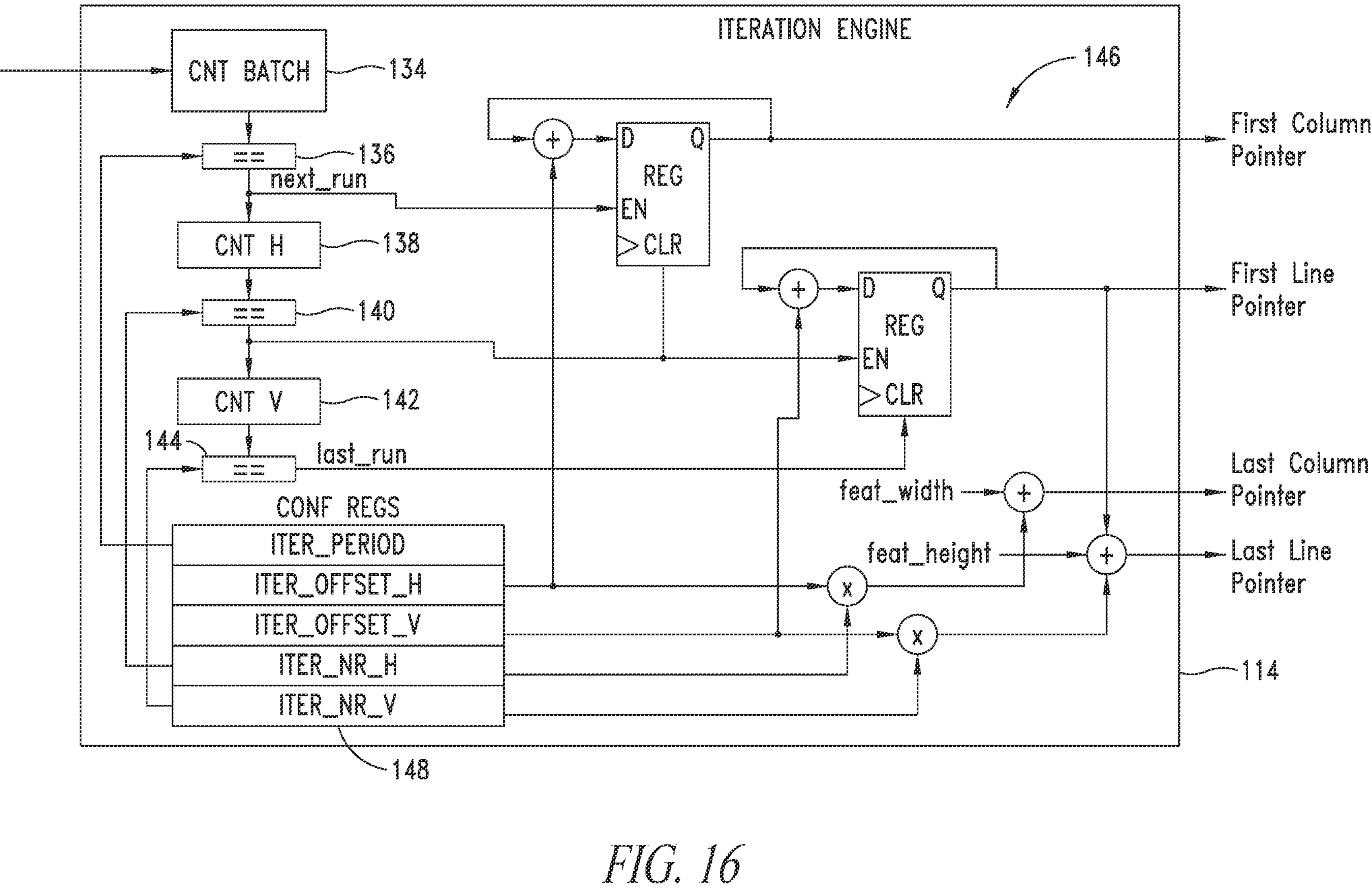
FIG. 16 is a functional block diagram of an embodiment of an iteration engine.

FIG. 16 is functional block diagram of an iteration engine 114 according to an embodiment. The iteration engine 114 of FIG. 16 may be employed, for example, as the iteration engine 114 of FIG. 9 or the iteration engine 114 of FIG. 12.

The iteration engine 114 as illustrated comprises a set of counters and comparators. A batch counter 134 and a batch comparator 136, in operation, track the number of batches processed and compare the number of batches processed to the iteration period parameter ITER_PERIOD. This information is used to control the sub-kernel to process in a current iteration. A horizontal operations counter 138 and a horizontal operations comparator 140 track the application of the current sub-kernel to feature data in the horizontal direction and compare a count of a number of horizontal operations to the number of horizontal operations parameter ITER_NR_H. This information is used to control convolving of the current sub-kernel with a window (sub-tensor) of feature data associated with the current sub-kernel. A vertical operations counter 142 and a vertical operations comparator 144 track the application of the current sub-kernel to feature data in the vertical direction and compare a count of a number of vertical operations to the number of vertical operations parameter ITER_NR_V. This information is used to control convolving of the current sub-kernel with a window (sub-tensor) of feature data associated with the current sub-kernel.

The iteration engine 114 as illustrated also comprises feature data window control circuitry 146, which in operation, generates a first column pointer, a first line pointer, a last column pointer, and a last line pointer, based on a position of the current sub-kernel in the kernel being decomposed, the feature data, the horizontal offset parameter, ITER_OFFSET_H, the vertical offset parameter, ITER_OFFSET_V, the number of horizontal iterations parameter, ITER_NR_H, the number of vertical iterations parameter, ITER_NR_V, the width of the feature data of a batch and the height of the feature data of the batch. The pointers are used to determine or define a window of feature data to which a current sub-kernel is applied. Each window of feature data corresponds to a sub-tensor of a streamed feature data tensor. The parameters, as illustrated, are stored in a set of configuration registers 148 of the iteration engine 114. In some embodiments, the parameters may be stored in another configuration register (e.g., configuration registers 130 of FIG. 12), or various combinations thereof.

Embodiments of the iteration engine 114 of FIG. 16 may include more components than illustrated, may include fewer components than illustrated, may combine components, may separate components into sub-components, and various combination thereof. For example, the iteration engine 114 may include a processor or a state machine which, in operation, provide all or part of the functionality of the counters 134, 138, 142, the comparators 136, 140 and 144, and the feature data window control circuitry 146, etc.

Figure 17:
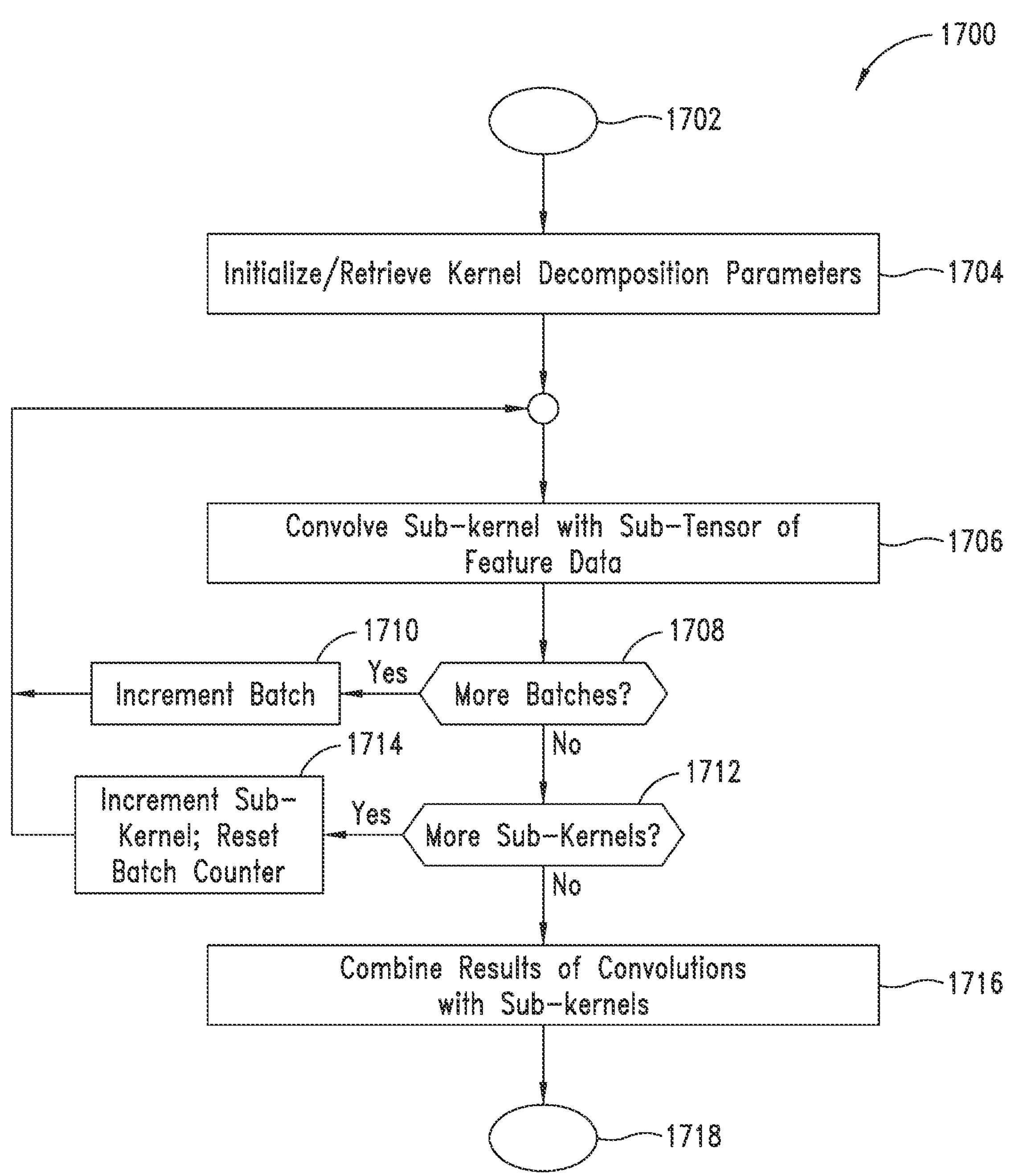
FIG. 17 illustrates a logical flow diagram generally showing one embodiment of a process for performing convolutions using kernel decomposition.

FIG. 17 is a flow chart of an embodiment of a method 1700 of convolving a kernel with a feature data tensor using a kernel decomposition process, which may be performed, for example, by the convolutional accelerator 112 using the iteration engine 114 of FIG. 9. The method 1700 starts at 1702, and proceeds to 1704.

At 1704, the method 1700 determines or retrieves the kernel decomposition parameters to be employed during the kernel decomposition process. For example, the parameters ITER_PERIOD, ITER_OFFSET_SET_H, ITER_OFFSET_V, ITER_NR_H, ITER_NR_V may be determined or retrieved. These parameters may be determined, for example, as discussed above with reference to FIGS. 10, 11, and 13-15. Other parameters may be determined or retrieved, such as the number of sub-kernels into which the kernel is to be decomposed, a stride parameter, padding parameters, etc. The method 1700 proceeds from 1704 to 1706.

Figure 18:
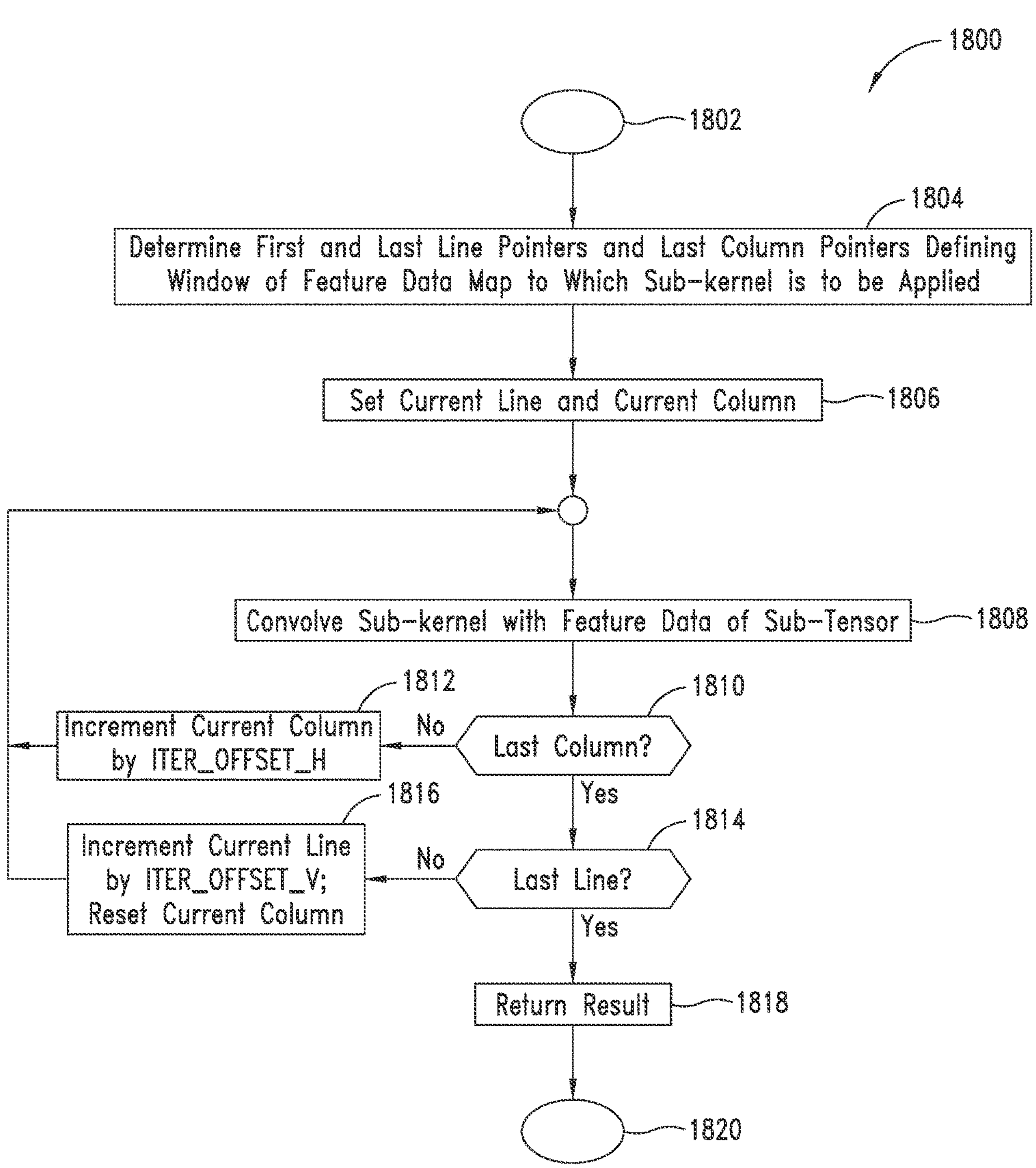
FIG. 18 illustrates a logical flow diagram generally showing one embodiment of a process for convolving a sub-kernel with a sub-tensor of feature data.

At 1706, the method 1700 convolves a current sub-kernel with a sub-tensor of a feature data tensor associated with the current sub-kernel (e.g., a first sub-kernel is convolved with a first sub-tensor of a feature data tensor). As discussed above with reference to FIGS. 13-16, a window for a respective sub-kernel may be defined by a first feature data line pointer, a first feature data column pointer, a last feature data line pointer, and a last feature data column pointer for the respective sub-kernel. The window may be used to identify the feature data of a sub-tensor associated with the sub-kernel. FIG. 18, discussed in more detail below, is a flow chart illustrating an embodiment of a method of convolving a sub-kernel with a sub-tensor of feature data (e.g., a window of feature data), which may be employed by the method 1700. The method 1700 proceeds from 1706 to 1708.

At 1708, the method 1700 determines whether there are more batches to process using a current sub-kernel. When it is determined at 1708 that there are more batches to process using the current sub-kernel (Yes in FIG. 17), the method 1700 proceeds from 1708 to 1710, where the method 1700 increments a batch counter. The method 1700 proceeds from 1710 to 1706 to apply the current sub-kernel to the next batch. When it is not determined at 1708 that there are more batches to process using the current sub-kernel (No in FIG. 17), the method 1700 proceeds from 1708 to 1712.

At 1712, the method 1700 determines whether there are more sub-kernels to process in the kernel decomposition processing. When it is determined at 1712 that there are more sub-kernels to process (Yes in FIG. 17), the method 1700 proceeds from 1712 to 1714. At 1714, the method 1700 increments a sub-kernel counter and resets the batch counter. The method 1700 proceeds from 1714 to 1706 to apply the next sub-kernel to the first batch. When it is not determined at 1712 that there are more sub-kernels to process (No in FIG. 17), the method 1700 proceeds from 1712 to 1716.

At 1716, the method 1700 combines the results of convolutions of the sub-kernels with sub-tensors of the feature data tensor, generating a result corresponding to application of the kernel to the feature data tensor. The method 1700 proceeds from 1716 to 1718, where the method 1700 may terminate or perform other processing (e.g., provide the results to a calling program, returning to 1704 to process another set of batches of feature data, etc.).

FIG. 18 is a flow chart of an embodiment of a method 1800 of convolving a sub-kernel to a sub-tensor of a batch of a streamed feature data tensor organized as a number of rows of feature data intersecting a number of columns of feature data, which may be employed by the method 1700 of FIG. 17 at act 1706. The method 1800 starts at 1802, and proceeds to 1804.

At 1804, the method 1800 determines first and last line pointers and first and last column pointers defining a window of the streaming feature data map to which the current sub-kernel is to be applied. This may be done, for example, based on the height H and width W of the batch of the streaming feature data map, the position of the sub-kernel in the kernel to which decomposition processing is being applied, and the parameters ITER_OFFSET_H, ITER_OFFSET_V, ITER_NR_H and ITER_NR_V. In some embodiments, other factors may be considered as well, such as the stride to be employed and whether padding is applied to the kernel to be decomposed.

The first line pointer associated with the sub-kernel may be determined based on the vertical position or vertical index i of the sub-kernel in the kernel and the ITER_OFFSET_V parameter. For example, with reference to FIG. 15, the sub-kernels $K_{S1}$ and $K_{S2}$ may be considered as having a vertical position index i of zero with respect to the kernel which is being decomposed; the sub-kernels $K_{S3}$ and $K_{S4}$ may be considered as having a vertical position index i of 1 with respect to the kernel which is being decomposed. The vertical position index i of the sub-kernel may be multiplied by the parameter ITER_OFFSET_V to determine the first line pointer of the window in the feature map that is associated with the sub-kernel. In FIG. 15, the ITER_OFFSET_V parameter is 2. Thus, for sub-kernel $K_{S1}$ and sub-kernel $K_{S2}$ of FIG. 15, the first line pointer of the window to which the sub-kernel is to be applied may be determined as follows:

$$\text{First Line Pointer} = i * \text{ITER\_OFFSET\_V}$$
$$0 = 0 * 2.$$

Similarly, for sub-kernel $K_{S3}$ and sub-kernel $K_{S4}$ of FIG. 15, the first line pointer of the window to which the sub-kernel is to be applied may be determined as follows:

$$\text{First Line Pointer} = i * \text{ITER\_OFFSET\_V}$$
$$2 = 1 * 2.$$

The last line pointer associated with the sub-kernel may be determined based on the vertical position index i of the sub-kernel in the kernel, the ITER_NR_V parameter, the ITER_OFFSET_V parameter, and the height H of the batch of the streaming feature data map. As noted above, with reference to FIG. 15, the sub-kernels $K_{S1}$ and $K_{S2}$ may be considered as having a vertical position index i of zero with respect to the kernel which is being decomposed; the sub-kernels $K_{S3}$ and $K_{S4}$ may be considered as having a vertical position i of 1 with respect to the kernel which is being decomposed, the parameter ITER_NR_V is 2, and the parameter ITER_OFFSET_V is 2. For sub-kernel $K_{S1}$ and sub-kernel $K_{S2}$ of FIG. 15, the last line pointer of the window to which the sub-kernel is to be applied may be determined as follows:

$$\text{Last Line Pointer} = H - (\text{ITER\_NR\_V} - i - 1) * \text{ITER\_OFFSET\_V} - 1$$
$$10 = 13 - (2 - 0 - 1) * 2 - 1$$

Similarly, for sub-kernel $K_{S3}$ and sub-kernel $K_{S4}$ of FIG. 15, the last line pointer of the window to which the sub-kernel is to be applied may be determined as follows:

$$\text{Last Line Pointer} = H - (\text{ITER\_NR\_V} - i - 1) * \text{ITER\_OFFSET\_V} - 1$$
$$12 = 13 - (2 - 1 - 1) * 2 - 1$$

The first column pointer associated with the sub-kernel may be determined based on the horizontal position or horizontal index j of the sub-kernel in the kernel and the ITER_OFFSET_H parameter. For example, with reference to FIG. 15, the sub-kernels $K_{S1}$ and $K_{S3}$ may be considered as having a horizontal position index j of zero with respect to the kernel which is being decomposed; the sub-kernels $K_{S2}$ and $K_{S4}$ may be considered as having a horizontal position index j of 1 with respect to the kernel which is being decomposed. The horizontal position index j of the sub-kernel may be multiplied by the parameter ITER_OFFSET_H to determine the first column pointer of the window in the batch of the streaming feature data map that is associated with the sub-kernel. In Figure the ITER_OFFSET_H parameter is 2. Thus, for sub-kernel $K_{S1}$ and sub-kernel $K_{S3}$ of FIG. 15, the first column pointer of the window to which the sub-kernel is to be applied may be determined as follows:

$$\text{First Column Pointer} = j * \text{ITER\_OFFSET\_H}$$
$$0 = 0 * 2.$$

Similarly, for sub-kernel $K_{S2}$ and sub-kernel $K_{S4}$ of FIG. 15, the first column pointer of the window to which the sub-kernel is to be applied may be determined as follows:

$$\text{First Column Pointer} = j * \text{ITER\_OFFSET\_H}$$
$$2 = 1 * 2.$$

The last column pointer associated with the sub-kernel may be determined based on the horizontal position index j of the sub-kernel in the kernel, the ITER_NR_H parameter, the ITER_OFFSET_H parameter, and the width W of the batch of the streaming feature data map. As noted above, with reference to FIG. 15, the sub-kernels $K_{S1}$ and $K_{S3}$ may be considered as having a horizontal position index j of zero with respect to the kernel which is being decomposed; the sub-kernels $K_{S2}$ and $K_{S4}$ may be considered as having a horizontal position j of 1 with respect to the kernel which is being decomposed, the ITER_NR_H parameter is 2, and the parameter ITER_OFFSET_H is 2. For sub-kernel $K_{S1}$ and sub-kernel $K_{S3}$ of FIG. 15, the last column pointer of the window to which the sub-kernel is to be applied may be determined as follows:

$$\text{Last Column Pointer} = W - (\text{ITER\_NR\_H} - j - 1) * \text{ITER\_OFFSET\_H} - 1$$
$$11 = 14 - (2 - 0 - 1) * 2 - 1$$

Similarly, for sub-kernel $K_{S2}$ and sub-kernel $K_{S4}$ of FIG. 15, the last column pointer of the window to which the sub-kernel is to be applied may be determined as follows:

$$\text{Last Column Pointer} = W - (\text{ITER\_NR\_H} - j - 1) * \text{ITER\_OFFSET\_H} - 1$$
$$13 = 14 - (2 - 1 - 1) * 2 - 1$$
$$13 = 14 - 0 - 1$$

The method 1800 proceeds from 1804 to 1806. At 1806, the method 1800 initializes a current line associated with the sub-kernel based on the first line pointer determined at 1804, and initializes a current column associated with the sub-kernel based on the first column pointer determined at 1804. The method 1800 proceeds from 1806 to 1808.

At 1808, the method 1800 convolves the sub-kernel with feature data of a sub-tensor of a feature data tensor corresponding to aligning the sub-kernel with the current line and current column of the feature data tensor. The method 1800 proceeds from 1808 to 1810.

At 1810, the method 1800 determines whether the current column is the last column associated with the sub-kernel based on the last column pointer determined at 1804. When it is not determined at 1810 (No in FIG. 18) that the current column is the last column, the method proceeds from 1810 to 1812, where the current column is incremented. For example, the value of the current column may be incremented by the value of the parameter ITER_OFFSET_H. The method 1800 proceeds from 1812 to 1808 to convolve the sub-kernel with the feature data corresponding to aligning the sub-kernel with the incremented column. When it is determined at 1810 that (Yes in FIG. 18) that the current column is the last column, the method proceeds from 1810 to 1814.

At 1814, the method 1800 determines whether the current line is the last line associated with the sub-kernel based on the last line pointer determined at 1804. When it is not determined at 1814 (No in FIG. 18) that the current line is the last line, the method proceeds from 1814 to 1816, where the current line is incremented and the current column is reset to the first column. The value of current line may be incremented, for example, by the value of the parameter ITER_OFFSET_V. The method 1800 proceeds from 1814 to 1808 to convolve the sub-kernel with the feature data corresponding to aligning the sub-kernel with the incremented line and the reset column. When it is determined at 1814 that (Yes in FIG. 18) that the current line is the last line, the method proceeds from 1814 to 1818.

At 1818, the method 1800 returns a result of convolving the sub-kernel with the defined window of the feature data map, which corresponds to convolving the sub-kernel with a sub-tensor of a feature data tensor. The method 1800 proceeds from 1718 to 1820, where the method 1800 may terminate or perform other processing (e.g., returning to 1806 to process another sub-kernel).

Embodiments of the foregoing processes and methods may contain additional acts not shown in FIGS. 17 and 18, may not contain all of the acts shown in FIGS. 17 and 18, may perform acts shown in FIGS. 17 and 18 in various orders, may combine acts, and may be modified in various respects. For example, FIG. 18 may be modified to account for a stride parameter.

In an embodiment, a convolutional accelerator comprises a feature line buffer, a kernel buffer, a multiply-accumulate cluster coupled to the feature line buffer and the kernel buffer, and iteration control circuitry. The iteration control circuitry, in operation, defines a plurality of sub-tensors of a streamed feature data tensor. The convolutional accelerator, in operation, decomposes a kernel into a plurality of sub-kernels and iteratively convolves the sub-kernels with respective sub-tensors of the defined plurality of sub-tensors of the streamed feature data tensor. In an embodiment, the iteration control circuitry, in operation, generates sets of pointers to define windows of the streamed feature data tensor, the windows corresponding to respective sub-tensors of the plurality of sub-tensors. In an embodiment, a set of pointers defining a respective window comprises a first line pointer, a last line pointer, a first column pointer, and a last column pointer. In an embodiment, the iteration control circuitry, in operation: generates the first line pointer based on a vertical position of the sub-kernel in the kernel, and a vertical iteration offset parameter defined for the kernel decomposition; generates the last line pointer based on the vertical position of the sub-kernel in the kernel, a number of vertical iterations parameter defined for the kernel decomposition, the vertical iteration offset parameter, and a height of the streamed feature data tensor; generates the first column pointer based on the horizontal position of the sub-kernel in the kernel, and a horizontal iteration offset parameter defined for the kernel decomposition; and generates the last column pointer based on the horizontal position of the sub-kernel in the kernel, a number of horizontal iterations parameter defined for the kernel decomposition, the horizontal iteration offset parameter, and a width of the streamed feature data tensor. In an embodiment, the first line pointer is determined according to:

$$\text{first line pointer} = i * \text{ITER\_OFFSET\_V};$$

the last line pointer is determined according to:

$$\text{last line pointer} = H - (\text{ITER\_NR\_V} - i - 1) * \text{ITER\_OFFSET\_V} - 1;$$

the first column pointer is determined according to:

$$\text{first column pointer} = j * \text{ITER\_OFFSET\_H}; \text{ and}$$

the last column pointer is determined according to:

$$\text{last column pointer} = W - (\text{ITER\_NR\_H} - j - 1) * \text{ITER\_OFFSET\_H} - 1,$$

where i is a vertical position index of the sub-kernel, ITER_OFFSET_V is the vertical offset parameter defined for the kernel decomposition, ITER_NR_V is the number of vertical iterations parameter defined for the kernel decomposition, H is the height of the streamed feature data tensor; j is a horizontal position index of the sub-kernel, ITER_OFFSET_H is the horizontal offset parameter defined for the kernel decomposition, ITER_NR_H is the number of horizontal iterations parameter defined for the kernel decomposition, and W is the width of the streamed feature data tensor.

In an embodiment, the streamed feature data tensor is organized into a number of batches, each batch having a same height, a same width and a same depth, and an iteration for a sub-kernel has an iteration length equal to the number of batches. In an embodiment, the streamed feature data tensor is repeatedly streamed to the convolutional accelerator during the iterative convolving of the sub-kernels with the respective sub-tensors. In an embodiment, the convolutional accelerator, in operation, defines decomposition control parameters including: an iteration period, ITER_PERIOD, defining a length of an iteration of the convolving of a sub-kernel with a respective sub-tensor; a horizontal offset, ITER_OFFSET_H, defining an offset between adjacent sub-kernels in the horizontal direction; a vertical offset, ITER_OFFSET_V, defining an offset between adjacent sub-kernels in the vertical direction; a number of horizontal operations, ITER_NR_H, defining a number of horizontal operations performed during an iteration associated with a sub-kernel; and a number of vertical operations, ITER_NR_V, defining a number of vertical operations performed during an iteration associated with a sub-kernel. In an embodiment, the convolving a sub-kernel with a sub-tensor is based on: a stride parameter; a padding parameter; or a stride parameter and a padding parameter. In an embodiment, the convolutional accelerator comprises a set of configuration registers, which, in operation, store the decomposition control parameters.

In an embodiment, a system comprises a stream engine and a convolutional accelerator coupled to the stream engine. The stream engine, in operation, streams feature and kernel data. The convolutional accelerator includes a feature line buffer, a kernel buffer, a multiply-accumulate cluster coupled to the feature line buffer and the kernel buffer, and iteration control circuitry. The iteration control circuitry, in operation, defines a plurality of sub-tensors of a streamed feature data tensor. The convolutional accelerator, in operation, decomposes a kernel into a plurality of sub-kernels and iteratively convolves the sub-kernels with respective sub-tensors of the defined plurality of sub-tensors of the streamed feature data tensor. In an embodiment, the iteration control circuitry, in operation, generates sets of pointers to define windows of the streamed feature data tensor, the windows corresponding to respective sub-tensors of the plurality of sub-tensors. In an embodiment, the streamed feature data tensor is organized into a number of batches, each batch having a same height, a same width and a same depth, and an iteration for a sub-kernel has an iteration length equal to the number of batches. In an embodiment, the stream engine, in operation, repeatedly streams the streamed feature data tensor to the convolutional accelerator during the iterations. In an embodiment, the system, in operation, defines decomposition control parameters including: an iteration period, ITER_PERIOD, defining a length of iterations applied to sub-kernels of the kernel; a horizontal offset, ITER_OFFSET_H, defining an offset between adjacent sub-kernels in the horizontal direction; a vertical offset, ITER_OFFSET_V, defining an offset between adjacent sub-kernels in the vertical direction; a number of horizontal operations, ITER_NR_H, defining a number of horizontal operations performed during an iteration associated with a sub-kernel; and a number of vertical operations, ITER_NR_V, defining a number of vertical operations performed during an iteration associated with a sub-kernels. In an embodiment, the stream engine, in operation, streams kernel data to the convolutional accelerator organized based on the sub-kernels of the kernel.

In an embodiment, a method comprises: streaming feature data and kernel data to a convolutional accelerator; and convolving a kernel of the kernel data with a streamed feature data tensor of the feature data. The convolving includes: decomposing the kernel into a plurality of sub-kernels; defining a plurality of sub-tensors of the streamed feature data tensor; and iteratively convolving the sub-kernels with respective sub-tensors of the plurality of sub-tensors of the streamed feature data tensor. In an embodiment, the method comprises generating sets of pointers to define windows of the streamed feature data tensor, the windows corresponding to respective sub-tensors of the plurality of sub-tensors, wherein a set of pointers defining a respective window comprises a first line pointer, a last line pointer, a first column pointer, and a last column pointer. In an embodiment, the method comprises: organizing the streamed feature data tensor into a number of batches of feature data, each batch having a same height, a same width and a same depth, an iteration for a sub-kernel having an iteration length equal to the number of batches. In an embodiment, the method comprises repeatedly streaming the streamed feature data tensor during the iterations. In an embodiment, the method comprises defining decomposition control parameters including: an iteration period, ITER_PERIOD, defining a length of iterations applied to sub-kernels of the kernel; a horizontal offset, ITER_OFFSET_H, defining an offset between adjacent sub-kernels in the horizontal direction; a vertical offset, ITER_OFFSET_V, defining an offset between adjacent sub-kernels in the vertical direction; a number of horizontal operations, ITER_NR_H, defining a number of horizontal operations performed during an iteration associated with a sub-kernel; and a number of vertical operations, ITER_NR_V, defining a number of vertical operations performed during an iteration associated with a sub-kernels.

In an embodiment, a non-transitory computer-readable medium's contents configure a hardware accelerator to perform a method. The method comprises: streaming feature data and kernel data to a convolutional accelerator of the hardware accelerator; and convolving a kernel of the kernel data with a streamed feature data tensor of the feature data. The convolving includes: decomposing the kernel into a plurality of sub-kernels; defining a plurality of sub-tensors of the streamed feature data tensor; and iteratively convolving the sub-kernels with respective sub-tensors of the plurality of sub-tensors of the streamed feature data tensor. In an embodiment, the method comprises generating sets of pointers to define respective windows of the streamed feature data tensor, wherein a set of pointers defining a respective window comprises a first line pointer, a last line pointer, a first column pointer, and a last column pointer. In an embodiment, the method comprises: organizing the feature data into a number of batches of feature data, each batch having a same height, a same width and a same depth. In an embodiment, the contents comprise instructions executed by the hardware accelerator.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A convolutional accelerator, comprising:

a feature line buffer;

a kernel buffer;

a multiply-accumulate cluster coupled to the feature line buffer and the kernel buffer; and iteration control circuitry, which, in operation, defines a plurality of sub-tensors of a streamed feature data tensor, wherein the convolutional accelerator, in operation, decomposes a kernel into a plurality of sub-kernels and iteratively convolves the sub-kernels with respective sub-tensors of the defined plurality of sub-tensors of the streamed feature data tensor, wherein, the iteration control circuitry, in operation, generates sets of pointers to define windows of the streamed feature data tensor, the windows corresponding to respective sub-tensors of the plurality of sub-tensors, a set of pointers defining a respective window comprises a first line pointer, a last line pointer, a first column pointer, and a last column pointer, and the iteration control circuitry, in operation:

generates the first line pointer based on a vertical position of the sub-kernel in the kernel, and a vertical iteration offset parameter defined for the kernel decomposition;

generates the last line pointer based on the vertical position of the sub-kernel in the kernel, a number of vertical iterations parameter defined for the kernel decomposition, the vertical iteration offset parameter, and a height of the streamed feature data tensor;

generates the first column pointer based on the horizontal position of the sub-kernel in the kernel, and a horizontal iteration offset parameter defined for the kernel decomposition; and generates the last column pointer based on the horizontal position of the sub-kernel in the kernel, a number of horizontal iterations parameter defined for the kernel decomposition, the horizontal iteration offset parameter, and a width of the streamed feature data tensor.

2. The convolutional accelerator of claim 1, wherein:

the first line pointer is determined according to:

$$\text{first line pointer} = i * \text{ITER\_OFFSET\_V};$$

the last line pointer is determined according to:

$$\text{last line pointer} = H - (\text{ITER\_NR\_V} - i - 1) * \text{ITER\_OFFSET\_V} - 1;$$

the first column pointer is determined according to:

first column pointer=j*ITER_OFFSET_H; and the last column pointer is determined according to:

$$\text{last column pointer} = W - (\text{ITER\_NR\_H} - j - 1) * \text{ITER\_OFFSET\_H} - 1,$$

where i is a vertical position index of the sub-kernel, ITER_OFFSET_V is the vertical offset parameter defined for the kernel decomposition, ITER_NR_V is the number of vertical iterations parameter defined for the kernel decomposition, H is the height of the streamed feature data tensor; j is a horizontal position index of the sub-kernel, ITER_OFFSET_H is the horizontal offset parameter defined for the kernel decomposition, ITER_NR_H is the number of horizontal iterations parameter defined for the kernel decomposition, and W is the width of the streamed feature data tensor.

3. The convolutional accelerator of claim 1, wherein the streamed feature data tensor is organized into a number of batches, each batch having a same height, a same width and a same depth, and an iteration for a sub-kernel has an iteration length equal to the number of batches.

4. The convolutional accelerator of claim 3, wherein the streamed feature data tensor is repeatedly streamed to the convolutional accelerator during the iterative convolving of the sub-kernels with the respective sub-tensors.

5. The convolutional accelerator of claim 1, wherein the convolving a sub-kernel with a sub-tensor is based on:

a stride parameter;

a padding parameter; or a stride parameter and a padding parameter.

6. A convolutional accelerator, comprising:

a feature line buffer;

a kernel buffer;

a multiply-accumulate cluster coupled to the feature line buffer and the kernel buffer; and iteration control circuitry, which, in operation, defines a plurality of sub-tensors of a streamed feature data tensor, wherein the convolutional accelerator, in operation, decomposes a kernel into a plurality of sub-kernels and iteratively convolves the sub-kernels with respective sub-tensors of the defined plurality of sub-tensors of the streamed feature data tensor, wherein the convolutional accelerator, in operation, defines decomposition control parameters including:

an iteration period, ITER_PERIOD, defining a length of an iteration of the convolving of a sub-kernel with a respective sub-tensor;

a horizontal offset, ITER_OFFSET_H, defining an offset between adjacent sub-kernels in the horizontal direction;

a vertical offset, ITER_OFFSET_V, defining an offset between adjacent sub-kernels in the vertical direction;

a number of horizontal operations, ITER_NR_H, defining a number of horizontal operations performed during an iteration associated with a sub-kernel; and a number of vertical operations, ITER_NR_V, defining a number of vertical operations performed during an iteration associated with a sub-kernel.

7. The convolutional accelerator of claim 6, wherein the iteration control circuitry, in operation, generates sets of pointers to define windows of the streamed feature data tensor, the windows corresponding to respective sub-tensors of the plurality of sub-tensors.

8. The convolutional accelerator of claim 7, wherein a set of pointers defining a respective window comprises a first line pointer, a last line pointer, a first column pointer, and a last column pointer.

9. The convolutional accelerator of claim 8, wherein the iteration control circuitry, in operation:

generates the first line pointer based on a vertical position of the sub-kernel in the kernel, and a vertical iteration offset parameter defined for the kernel decomposition;

generates the last line pointer based on the vertical position of the sub-kernel in the kernel, a number of vertical iterations parameter defined for the kernel decomposition, the vertical iteration offset parameter, and a height of the streamed feature data tensor;

generates the first column pointer based on the horizontal position of the sub-kernel in the kernel, and a horizontal iteration offset parameter defined for the kernel decomposition; and generates the last column pointer based on the horizontal position of the sub-kernel in the kernel, a number of horizontal iterations parameter defined for the kernel decomposition, the horizontal iteration offset parameter, and a width of the streamed feature data tensor.

10. The convolutional accelerator of claim 6, wherein the convolving a sub-kernel with a sub-tensor is based on:

a stride parameter;

a padding parameter; or a stride parameter and a padding parameter.

11. The convolutional accelerator of claim 6, comprising a set of configuration registers, which, in operation, store the decomposition control parameters.

12. The convolutional accelerator of claim 6, wherein the streamed feature data tensor is organized into a number of batches, each batch having a same height, a same width and a same depth, and an iteration for a sub-kernel has an iteration length equal to the number of batches.

13. A system, comprising:

a stream engine, which, in operation, streams feature and kernel data; and a convolutional accelerator coupled to the stream engine, the convolutional accelerator including:

a feature line buffer;

a kernel buffer;

a multiply-accumulate cluster coupled to the feature line buffer and the kernel buffer; and iteration control circuitry, which, in operation, defines a plurality of sub-tensors of a streamed feature data tensor, wherein the convolutional accelerator, in operation, decomposes a kernel into a plurality of sub-kernels and iteratively convolves the sub-kernels with respective sub-tensors of the defined plurality of sub-tensors of the streamed feature data tensor, wherein the system, in operation, defines decomposition control parameters including:

an iteration period, ITER_PERIOD, defining a length of iterations applied to sub-kernels of the kernel;

a horizontal offset, ITER_OFFSET_H, defining an offset between adjacent sub-kernels in the horizontal direction;

a vertical offset, ITER_OFFSET_V, defining an offset between adjacent sub-kernels in the vertical direction;

a number of horizontal operations, ITER_NR_H, defining a number of horizontal operations performed during an iteration associated with a sub-kernel; and a number of vertical operations, ITER_NR_V, defining a number of vertical operations performed during an iteration associated with a sub-kernel.

14. The system of claim 13, wherein the iteration control circuitry, in operation, generates sets of pointers to define windows of the streamed feature data tensor, the windows corresponding to respective sub-tensors of the plurality of sub-tensors.

15. The system of claim 13, wherein the streamed feature data tensor is organized into a number of batches, each batch having a same height, a same width and a same depth, and an iteration for a sub-kernel has an iteration length equal to the number of batches.

16. The system of claim 15, wherein the stream engine, in operation, repeatedly streams the streamed feature data tensor to the convolutional accelerator during the iterations.

17. The system of claim 13, wherein the stream engine, in operation, streams kernel data to the convolutional accelerator organized based on the sub-kernels of the kernel.

18. A method, comprising:

streaming feature data and kernel data to a convolutional accelerator; and convolving a kernel of the kernel data with a streamed feature data tensor of the feature data, the convolving including:

decomposing the kernel into a plurality of sub-kernels;

defining a plurality of sub-tensors of the streamed feature data tensor; and iteratively convolving the sub-kernels with respective sub-tensors of the plurality of sub-tensors of the streamed feature data tensor, wherein the method comprises defining decomposition control parameters including:

an iteration period, ITER_PERIOD, defining a length of iterations applied to sub-kernels of the kernel;

a horizontal offset, ITER_OFFSET_H, defining an offset between adjacent sub-kernels in the horizontal direction;

a vertical offset, ITER_OFFSET_V, defining an offset between adjacent sub-kernels in the vertical direction;

a number of horizontal operations, ITER_NR_H, defining a number of horizontal operations performed during an iteration associated with a sub-kernel; and a number of vertical operations, ITER_NR_V, defining a number of vertical operations performed during an iteration associated with a sub-kernel.

19. The method of claim 18, comprising generating sets of pointers to define windows of the streamed feature data tensor, the windows corresponding to respective sub-tensors of the plurality of sub-tensors, wherein a set of pointers defining a respective window comprises a first line pointer, a last line pointer, a first column pointer, and a last column pointer.

20. The method of claim 18, comprising:

organizing the streamed feature data tensor into a number of batches of feature data, each batch having a same height, a same width and a same depth, an iteration for a sub-kernel having an iteration length equal to the number of batches.

21. The method of claim 18, comprising repeatedly streaming the streamed feature data tensor during the iterations.

22. A non-transitory computer-readable medium having contents which configure a hardware accelerator to perform a method, the method comprising:

streaming feature data and kernel data to a convolutional accelerator of the hardware accelerator; and convolving a kernel of the kernel data with a streamed feature data tensor of the feature data, the convolving including:

decomposing the kernel into a plurality of sub-kernels;

defining a plurality of sub-tensors of the streamed feature data tensor; and iteratively convolving the sub-kernels with respective sub-tensors of the plurality of sub-tensors of the streamed feature data tensor, wherein the method comprises defining decomposition control parameters including:

an iteration period, ITER_PERIOD, defining a length of iterations applied to sub-kernels of the kernel;

a horizontal offset, ITER_OFFSET_H, defining an offset between adjacent sub-kernels in the horizontal direction;

a vertical offset, ITER_OFFSET_V, defining an offset between adjacent sub-kernels in the vertical direction;

a number of horizontal operations, ITER_NR_H, defining a number of horizontal operations performed during an iteration associated with a sub-kernel; and a number of vertical operations, ITER_NR_V, defining a number of vertical operations performed during an iteration associated with a sub-kernel.

23. The non-transitory computer-readable medium of claim 22, wherein the method comprises generating sets of pointers to define respective windows of the streamed feature data tensor, wherein a set of pointers defining a respective window comprises a first line pointer, a last line pointer, a first column pointer, and a last column pointer.

24. The non-transitory computer-readable medium of claim 22, wherein the method comprises:

organizing the feature data into a number of batches of feature data, each batch having a same height, a same width and a same depth.

25. The non-transitory computer-readable medium of claim 22, wherein the contents comprise instructions executed by the hardware accelerator.

* * * * *